United States Patent
Moro et al.

(10) Patent No.: US 10,746,416 B2
(45) Date of Patent: Aug. 18, 2020

(54) INDOOR UNIT OF AIR-CONDITIONING APPARATUS

(71) Applicant: Mitsubishi Electric Corporation, Tokyo (JP)

(72) Inventors: Koki Moro, Tokyo (JP); Masayuki Oishi, Tokyo (JP); Syuhei Yokota, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 390 days.

(21) Appl. No.: 15/545,353

(22) PCT Filed: Apr. 17, 2015

(86) PCT No.: PCT/JP2015/061872
§ 371 (c)(1),
(2) Date: Jul. 21, 2017

(87) PCT Pub. No.: WO2016/166894
PCT Pub. Date: Oct. 20, 2016

(65) Prior Publication Data
US 2018/0010812 A1 Jan. 11, 2018

(51) Int. Cl.
*F24F 1/0029* (2019.01)
*F24F 1/0057* (2019.01)
(Continued)

(52) U.S. Cl.
CPC ........ *F24F 1/0029* (2013.01); *B01D 46/0072* (2013.01); *F24F 1/0033* (2013.01);
(Continued)

(58) Field of Classification Search
CPC ............ B01D 46/0072; B01D 2279/50; F24F 1/0029; F24F 1/0057; F24F 13/30;
(Continued)

(56) References Cited

U.S. PATENT DOCUMENTS

2004/0000160 A1* 1/2004 Takashima ........... B01D 46/002
62/317
2005/0257561 A1* 11/2005 Lee ......................... F04D 33/00
62/419
(Continued)

FOREIGN PATENT DOCUMENTS

CN 103140717 A 6/2013
EP 0 985 890 A 3/2000
(Continued)

OTHER PUBLICATIONS

International Search Report of the International Searching Authority dated Jul. 14, 2015 for the corresponding international application No. PCT/JP2015/061872 (and English translation).
(Continued)

*Primary Examiner* — Minh Chau T Pham
(74) *Attorney, Agent, or Firm* — Posz Law Group, PLC

(57) ABSTRACT

An indoor unit of an air-conditioning apparatus includes a fan unit having an axial fan and a motor that drives the axial fan. The indoor unit also includes a pair of support arms on a back plate constituting a back surface of a casing. The fan unit is supported by the pair of support arms from the below.

15 Claims, 26 Drawing Sheets

(51) Int. Cl.
| | |
|---|---|
| *F24F 13/30* | (2006.01) |
| *F24F 13/28* | (2006.01) |
| *F24F 13/20* | (2006.01) |
| *F24F 1/0033* | (2019.01) |
| *F24F 13/32* | (2006.01) |
| *F24F 13/00* | (2006.01) |
| *F24F 1/00* | (2019.01) |
| *B01D 46/00* | (2006.01) |

(52) U.S. Cl.
CPC ............ *F24F 1/0057* (2019.02); *F24F 13/20* (2013.01); *F24F 13/28* (2013.01); *F24F 13/30* (2013.01); *F24F 13/32* (2013.01); *B01D 2279/50* (2013.01); *F24F 2221/22* (2013.01)

(58) Field of Classification Search
CPC .......... F24F 13/28; F24F 13/20; F24F 1/0033; F24F 2221/22; F24F 13/32; F24F 13/00; F24F 1/00
USPC ......... 55/385.1, 282, 283; 62/262, 282, 317, 62/419, 428, 331, 291, 426, 513; 454/187, 325
See application file for complete search history.

(56) References Cited

U.S. PATENT DOCUMENTS

| | | | | |
|---|---|---|---|---|
| 2006/0162212 A1* | 7/2006 | Kim | ...................... | F24F 1/0007 40/725 |
| 2007/0060036 A1* | 3/2007 | Shibuya | ............. | B01D 46/0065 454/187 |
| 2010/0199700 A1* | 8/2010 | Yasuo | ................... | F24F 1/0007 62/291 |
| 2011/0138844 A1* | 6/2011 | Yamada | ................ | F24F 1/0007 62/419 |
| 2011/0138846 A1* | 6/2011 | Hayashi | .............. | F04D 29/4206 62/419 |
| 2012/0018117 A1 | 1/2012 | Yamada et al. | | |
| 2014/0227961 A1* | 8/2014 | Yasutomi | ................. | F24F 11/72 454/325 |
| 2018/0209684 A1* | 7/2018 | Kurosu | ................. | F24F 13/222 |
| 2018/0328621 A1* | 11/2018 | Naito | ...................... | F24F 13/20 |

FOREIGN PATENT DOCUMENTS

| | | | |
|---|---|---|---|
| EP | 1 767 873 A2 | 3/2007 | |
| EP | 2 602 562 A1 | 6/2013 | |
| EP | 3 006 837 A1 | 4/2016 | |
| GB | 2 305 500 A | 4/1997 | |
| JP | H07-27361 A | 1/1995 | |
| JP | 11-311446 A | 11/1999 | |
| JP | 2000161707 A * | 6/2000 | ............... F24F 1/00 |
| JP | 2000-241016 A | 9/2000 | |
| JP | 2002-106954 A | 4/2002 | |
| JP | 2013-133992 A | 7/2013 | |
| JP | 2013-181733 A | 9/2013 | |
| JP | 5425106 B2 | 2/2014 | |
| WO | 00/57113 A1 | 9/2000 | |
| WO | 2006/078083 A2 | 7/2006 | |
| WO | 2012/017480 A1 | 2/2012 | |
| WO | 2014/190780 A1 | 12/2014 | |

OTHER PUBLICATIONS

Extended European Search Report dated Apr. 3, 2017 for the corresponding European Patent Application No. 15 86 8661.8.
Office action dated Jun. 7, 2018 issued in corresponding Australian patent application No. 2015391312.
Office Action dated Aug. 9, 2019 issued in corresponding EP patent application No. 15868661.8.
Office Action dated Nov. 28, 2018 issued in corresponding Chinese patent application No. 201580048364.X (and English translation).
Office Action dated Aug. 28, 2018 issued in corresponding JP patent application No. 2017-512176 (and English translation).
Office Action dated Feb. 20, 2020 issued in corresponding EP patent application No. 15868661.8.

* cited by examiner

ENLARGED VIEW OF PART F

ENLARGED VIEW OF PART H

US 10,746,416 B2

INDOOR UNIT OF AIR-CONDITIONING APPARATUS

CROSS REFERENCE TO RELATED APPLICATION

This application is a U.S. national stage application of International Application No. PCT/JP2015/061872, filed on Apr. 17, 2015, the contents of which are incorporated herein by reference.

TECHNICAL FIELD

The present invention relates to an indoor unit of an air-conditioning apparatus having an axial fan.

BACKGROUND

An indoor unit of an air-conditioning apparatus, having an axial fan, has been proposed conventionally. Such a conventional indoor unit of an air-conditioning apparatus is equipped with a casing in which an air inlet is formed in the upper part and an air outlet is formed on the lower side of the front surface. The casing accommodates an axial fan provided downstream of the air inlet, and a heat exchanger provided downstream of the axial fan (see Patent Literature 1, for example).

PATENT LITERATURE

Patent Literature 1: Japanese Patent No. 5425106

In an indoor unit of an air-conditioning apparatus, the size of a heat exchanger is enlarged year by year along with improvements in functions. As such, it is also required to enlarge a casing for accommodating a heat exchanger. However, the size of an indoor unit in a vertical direction and a horizontal direction reached its limit due to constraints for installment or the like. As such, a front and back direction (depth) of a casing is the only part extendable corresponding to the size of a heat exchanger. Further, heavy objects such as a heat exchanger and a fan are mounted on a back plate constituting the back surface of the casing, conventionally.

In that case, when an axial fan is adopted as a fan of an indoor unit, the axial fan must be disposed above a heat exchanger. This means that as the size of a heat exchanger is enlarged, the axial fan is disposed at a position separated forward from the back plate. Further, a motor that drives the axial fan is also disposed at a position separated forward from the back plate, as the size of the heat exchanger is enlarged. As such, in a conventional indoor unit of an air-conditioning apparatus having an axial fan, when the axial fan and a motor that drives the axial fan are mounted on the back plate, the moment applied to a screw hole (screw hole formed in the back plate) of the mounting part is increased along with the enlargement of the heat exchanger, causing a problem that the screw hole may be broken.

SUMMARY

The present invention has been made to solve the problem as described above. A characteristic of the present invention is to achieve an indoor unit of an air-conditioning apparatus in which when an axial fan and a motor that drives the axial fan are mounted on a back plate, the moment applied to the mounting part can be reduced.

An indoor unit of an air-conditioning apparatus, according to the present invention, includes a casing having an air inlet formed in an upper surface, an air outlet formed below the air inlet, and a back plate constituting a back surface; a fan unit including a fan outer frame having a bell mouth, an axial fan provided in the bell mouth, and a motor that drives the axial fan, the fan unit being provided downstream of the air inlet in the casing; and a heat exchanger provided downstream of the axial fan in the casing, the heat exchanger being configured to exchange heat between the air, taken into the casing by the axial fan, and refrigerant. The back plate includes a pair of support arms protruding forward, and the fan unit is supported by the pair of support arms from the below.

In the indoor unit of the air-conditioning apparatus according to the present invention, the back plate includes a pair of holding arms protruding forward, and the fan unit having the axial fan and the motor is held by the pair of holding arms. As such, when the axial fan and the motor that drives the axial fan are mounted on the back plate, the moment applied to the mounting part can be reduced, whereby it is possible to prevent breakage of the screw hole of the mounting part.

DETAILED DESCRIPTION

An indoor unit of an air-conditioning apparatus according to an embodiment of the present invention will be described hereinafter with use of the drawings.

Figure 1:
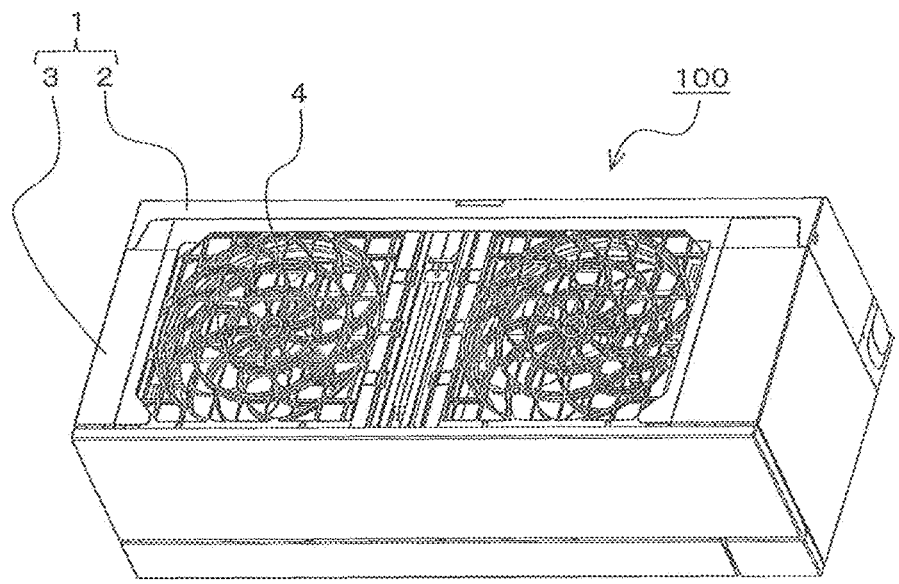
FIG. 1 is perspective view of an indoor unit of an air-conditioning apparatus according to an embodiment of the present invention, seen from the upper right front side.
Figure 2:
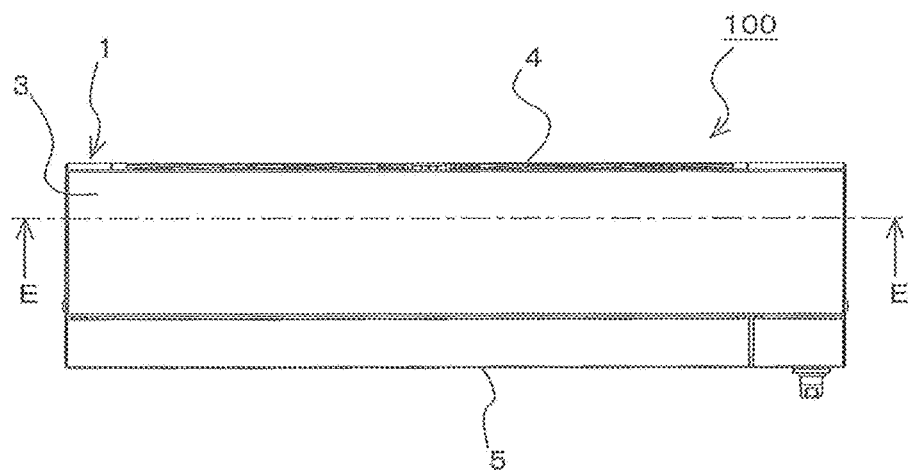
FIG. 2 is a front view of the indoor unit of the air-conditioning apparatus according to the embodiment of the present invention.
Figure 3:
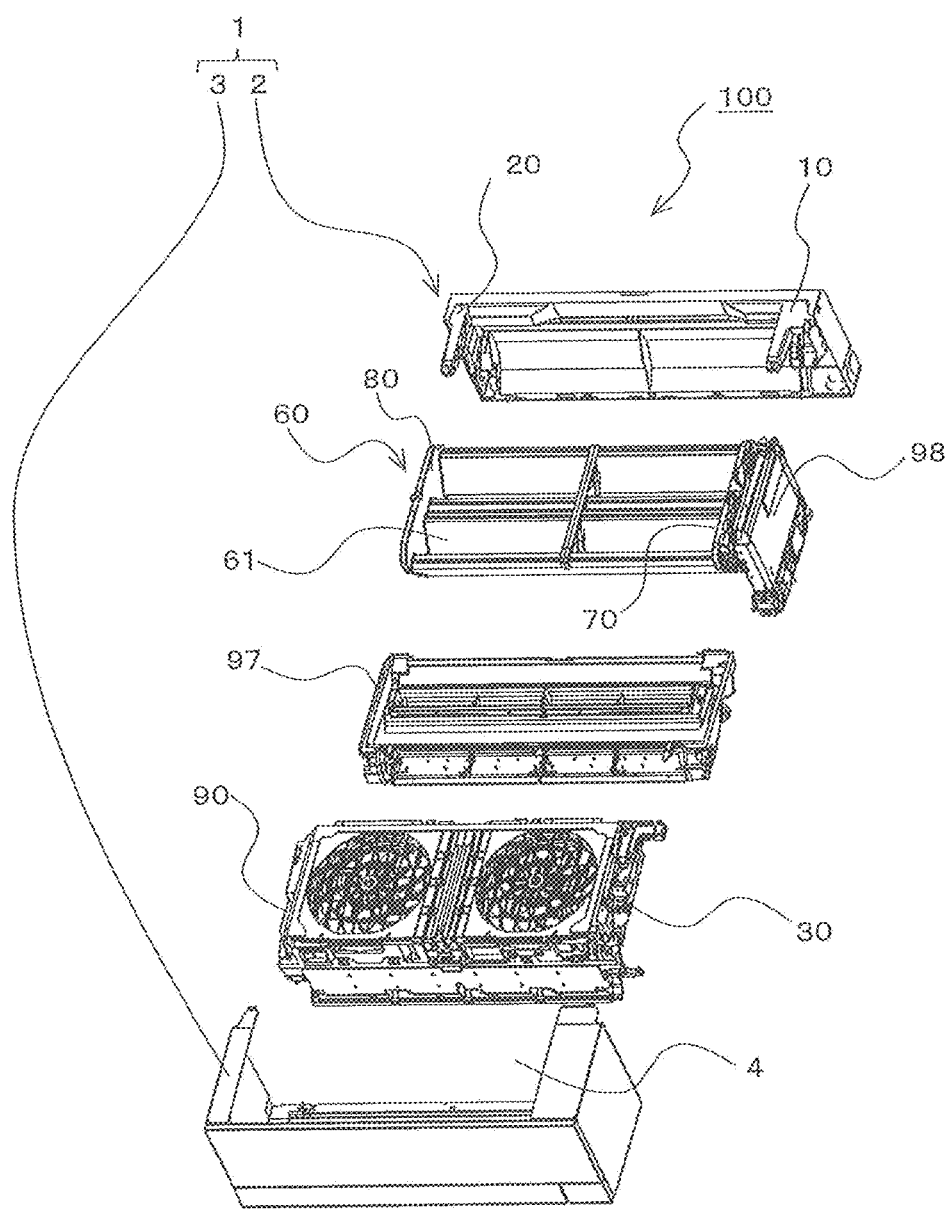
FIG. 3 is an exploded perspective view of the indoor unit of the air-conditioning apparatus according to the embodiment of the present invention, seen from the upper right front side.
Figure 4:
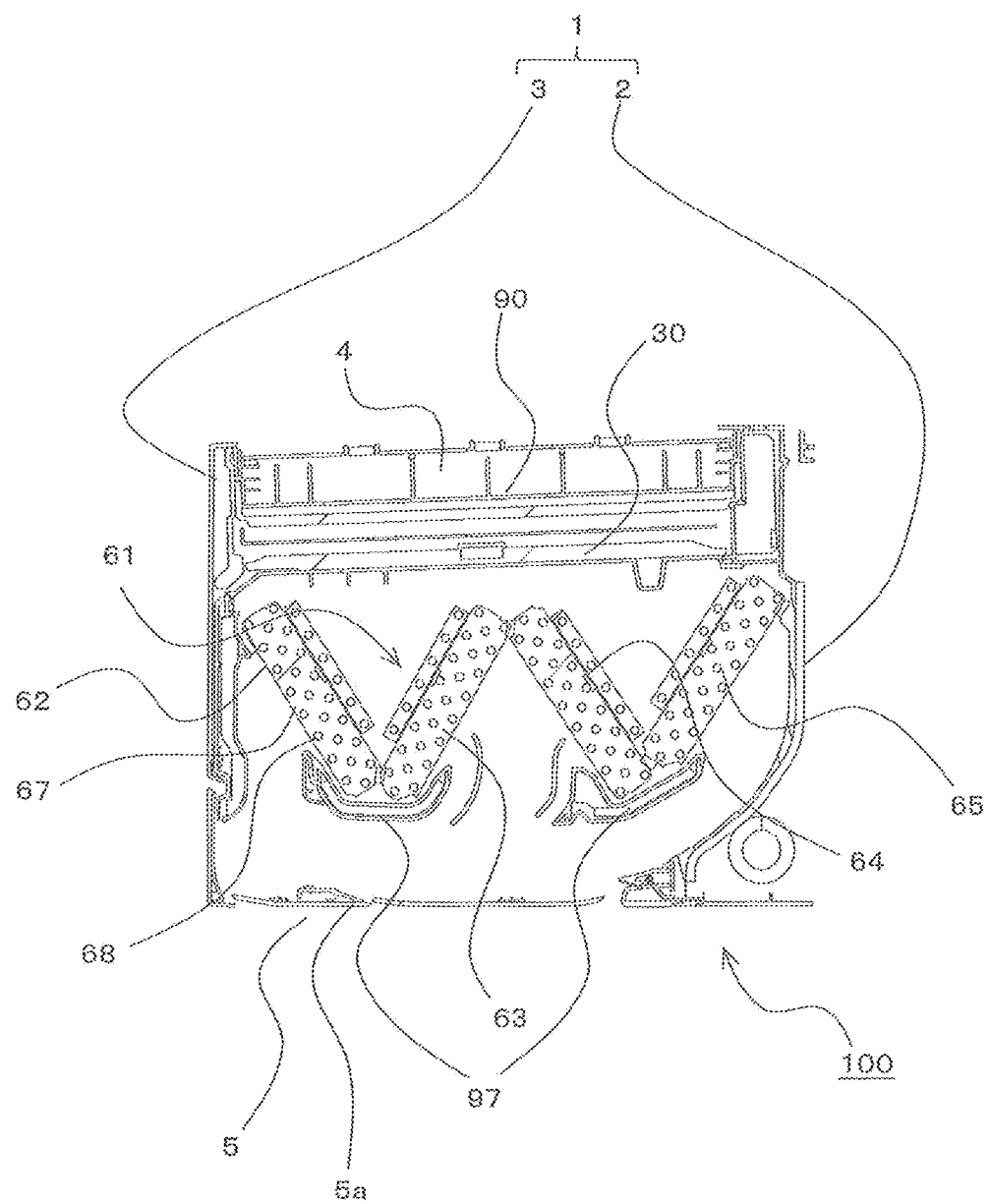
FIG. 4 is a side sectional view of the indoor unit of the air-conditioning apparatus according to the embodiment of the present invention.
Figure 5:
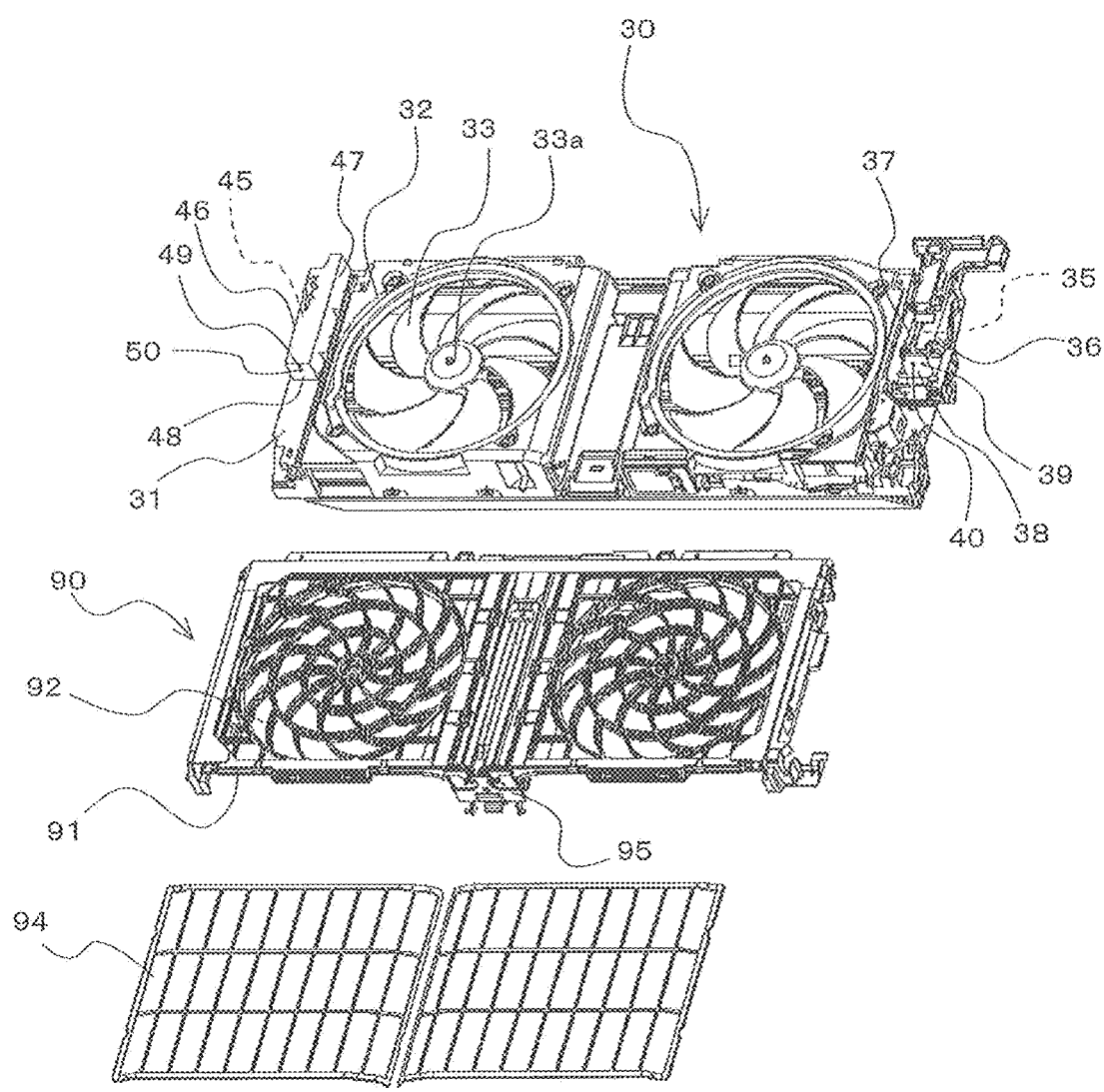
FIG. 5 is an exploded perspective view of a fan unit and a cleaning unit of the indoor unit of the air-conditioning apparatus according to the embodiment of the present invention, seen from the upper right front side.

FIG. 1 is a perspective view of an indoor unit of the air-conditioning apparatus, seen from the upper right front side, according to the embodiment of the present invention. FIG. 2 is a front view of the indoor unit of the air-conditioning apparatus. FIG. 3 is an exploded perspective view of the indoor unit of the air-conditioning apparatus, seen from the upper right front side. FIG. 4 is a side sectional view of the indoor unit of the air-conditioning apparatus. FIG. 5 is an exploded perspective view of a fan unit and a cleaning unit of the indoor unit of the air-conditioning apparatus, seen from the upper right front side. It should be noted that in FIG. 3, the left side of the figure is a front side of an indoor unit 100.

The indoor unit 100 of the present embodiment includes a casing 1 in which an air inlet 4 is formed in an upper surface and an air outlet 5 is formed below the air inlet 4, a fan unit 30 having an axial fan 33 that is a propeller fan, and a heat exchanger 60 configured to exchange heat between the air (indoor air) taken into the casing 1 by the axial fan 33 and refrigerant. It should be noted that in the present embodiment, the air outlet 5 is formed in a lower surface of the casing 1.

The casing 1 is in a substantially rectangular parallelepiped box shape, and is configured of a back plate 2 and a design panel 3. The back plate 2 constitutes a back surface of the casing 1. The design panel 3 constitutes a front surface (front part), right and left side surfaces, the upper surface, and the lower surface, of the casing 1. This means that the air inlet 4 and the air outlet 5 are formed in the design panel 3. Further, to the air outlet 5, a vertical wind direction plate 5a configured to adjust a vertical direction of the air blown out from the air outlet 5, and a lateral wind direction plate (not shown) configured to adjust a lateral direction of the air blown out from the air outlet 5. It should be noted that while the back plate 2 and the design panel 3 constitute the casing 1 in the present embodiment, this is just an example of the casing 1.

The fan unit 30 is provided downstream of the air inlet 4 in the casing 1. The fan unit 30 includes a fan outer frame 31 in which a bell mouth 32 is formed, at least one axial fan 33 provided in the bell mouth 32, and a motor 34 that drives the axial fan 33. It should be noted that in the present embodiment, two axial fans 33 are provided in parallel along the right and left direction of the casing 1. As such, in the fan outer frame 31, two bell mouths 32 are provided in parallel along the right and left direction of the casing 1. It should be noted that the number of axial fans 33 is just an example, and the number of axial fans 33 can be determined appropriately based on the air quantity that the indoor unit 100 is required. Further, the motor 34 that drives the axial fan 33 is incorporated in a boss 33a of the axial fan 33 (see FIG. 14 described below).

The fan unit 30, configured as described above, is to be mounted on the back plate 2 of the casing 1. The details of the amounting structure of the fan unit 30 to the back plate 2 will be described below.

The heat exchanger 60 is provided downstream of the axial fan 33, that is, the fan unit 30, in the casing 1. The heat exchanger 60 includes a heat exchanger main body 61 configured to exchange heat between the air (indoor air) taken into the casing 1 and refrigerant. The heat exchanger main body 61 includes, from the front face side to the back face side of the casing 1, a first heat exchange element 62, a second heat exchange element 63, a third heat exchange element 64, and a fourth heat exchange element 65. Each of the first heat exchange element 62, the second heat exchange element 63, the third heat exchange element 64 and the fourth heat exchange element 65 is configured of a plurality of heat transfer fins 67 provided in parallel with predetermined intervals, and a plurality of heat transfer pipes 68 extending through the heat transfer fins 67 in a direction that the heat transfer fins 67 are provided in parallel.

Further, the first heat exchange element 62, the second heat exchange element 63, the third heat exchange element 64 and the fourth heat exchange element 65 are formed in the same size and are arranged in a W shape when seen from a side face. It should be noted that the configuration of the heat exchanger main body 61 is not limited to this configuration. The respective heat exchange elements may be in different sizes, and the number of heat exchange elements (that is, a shape when seen from a side face) may also be arbitrary.

Further, the heat exchanger 60 of the present embodiment includes a pair of side plates (right side plate 70 and left side plate 80) attached to the right and left ends of the heat exchanger main body 61. The heat exchanger 60 is mounted on the back plate 2 of the casing 1 via the right side plate 70 and the left side plate 80. The details of the mounting structure of the heat exchanger 60 on the back plate 2 will be described below.

Further, the indoor unit 100 of the present embodiment also includes, in the casing 1, a cleaning unit 90, a drain pan 97, and an electric component box 98.

The cleaning unit 90 includes a cartridge 91, a filter 94, and a cleaning mechanism 95. The cartridge 91 is provided corresponding to the axial fan 33, and is disposed above the axial fan 33 (the air inlet 4, for example). Further, in the cartridge 91, an opening port 92 is formed at a position facing the axial fan 33. The cartridge 91 accommodates the filter 94 for removing dust from the air taken into the casing 1. As described above, two axial fans 33 are provided in the present embodiment. As such, two cartridges 91 and two filters 94 are provided corresponding to the axial fans 33. The cleaning mechanism 95, configured to remove the dust adhering to the filter 94 and store them, is provided between the cartridges 91. The cartridge 91 moves the filter 94 in a right and left direction by a moving mechanism not shown, with a configuration of removing the dust adhering to the filter 94 during movement.

The cleaning unit 90 is supported from the below by the fan unit 30.

The drain pan 97 is arranged below the heat exchanger 60, and is configured to receive dew dripping from the heat exchanger 60 and collect it. It is configured such that the dew collected by the drain pan 97 is discharged to the outside of the casing 1 via a drain pipe not shown.

The electric component box 98 is used for accommodating, for example, a control board for controlling the rotation speed and the like of the motor 34 that drives the axial fan 33. The electric component box 98 is disposed on the right side of the heat exchanger 60.

[Mounting Structures of Fan Unit 30 and Heat Exchanger 60]

Next, mounting structures of the fan unit 30 and the heat exchanger 60 of the present embodiment will be described in detail.

(Mounting Structure of Fan Unit 30)

Conventionally, heavy objects such as a heat exchanger and a fan are mounted on a back plate constituting the back surface of the casing. Here, in the case of adopting the axial fan 33 like the indoor unit 100 of the present embodiment, the axial fan 33 must be disposed above the heat exchanger 60. This means that as the heat exchanger 60 is enlarged, the axial fan 33 is disposed at a position separating forward from the back plate 2. The motor 34 that drives the axial fan 33 is also placed at a position separating forward from the back plate 2, along with the enlargement of the heat exchanger 60. As such, in the indoor unit 100 of the present embodiment having the axial fan 33, when the axial fan 33 and the motor 34 are mounted on the back plate 2 in a conventional configuration, larger moment is applied to the screw holes of the mounting part (screw holes formed in the back plate 2), along with the enlargement of the heat exchanger 60. As such, breakage of the screw holes of the mounting part is concerned.

Further, the indoor unit 100 of the present embodiment has a configuration in which the cleaning unit 90 is supported by the fan unit 30. As such, in the indoor unit 100, much larger moment is applied to the screw holes of the mounting part (screw holes formed in the back plate 2), whereby breakage of the screw holes of the mounting part is more concerned.

Further, in the indoor unit 100 of the present embodiment, it is also assumed that the back plate 2 may be made of resin with the aim of achieving weight reduction. When the back plate 2 is made of resin, breakage of the screw holes of the mounting part is more concerned.

However, with a structure that a pair of support arms 10 and 20, protruding forward, are provided to the back plate 2 and the fan unit 30 is supported by the support arms 10 and 20, as shown below, it is possible to prevent breakage of the screw holes of the mounting part (screw holes formed in the back plate 2).

The details of the mounting structure of the fan unit 30 will be described below with use of the drawings.

Figure 6:
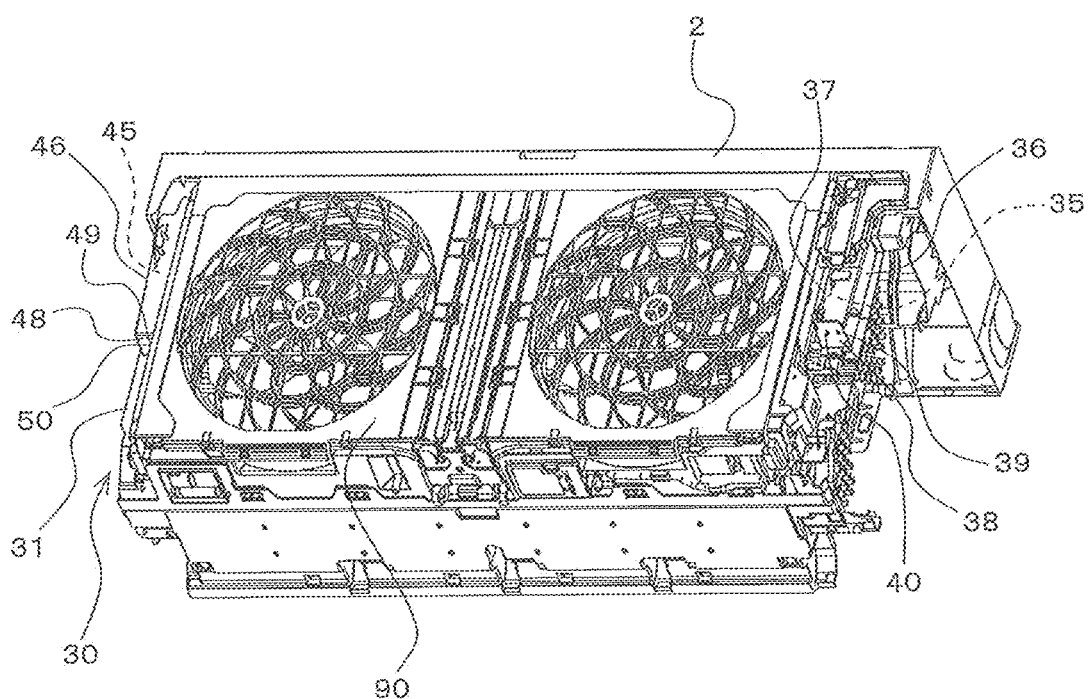
FIG. 6 is an assembly perspective view of a back plate, a heat exchanger, and the fan unit, seen from the upper right front side, in the indoor unit of the air-conditioning apparatus according to the embodiment of the present invention.
Figure 7:
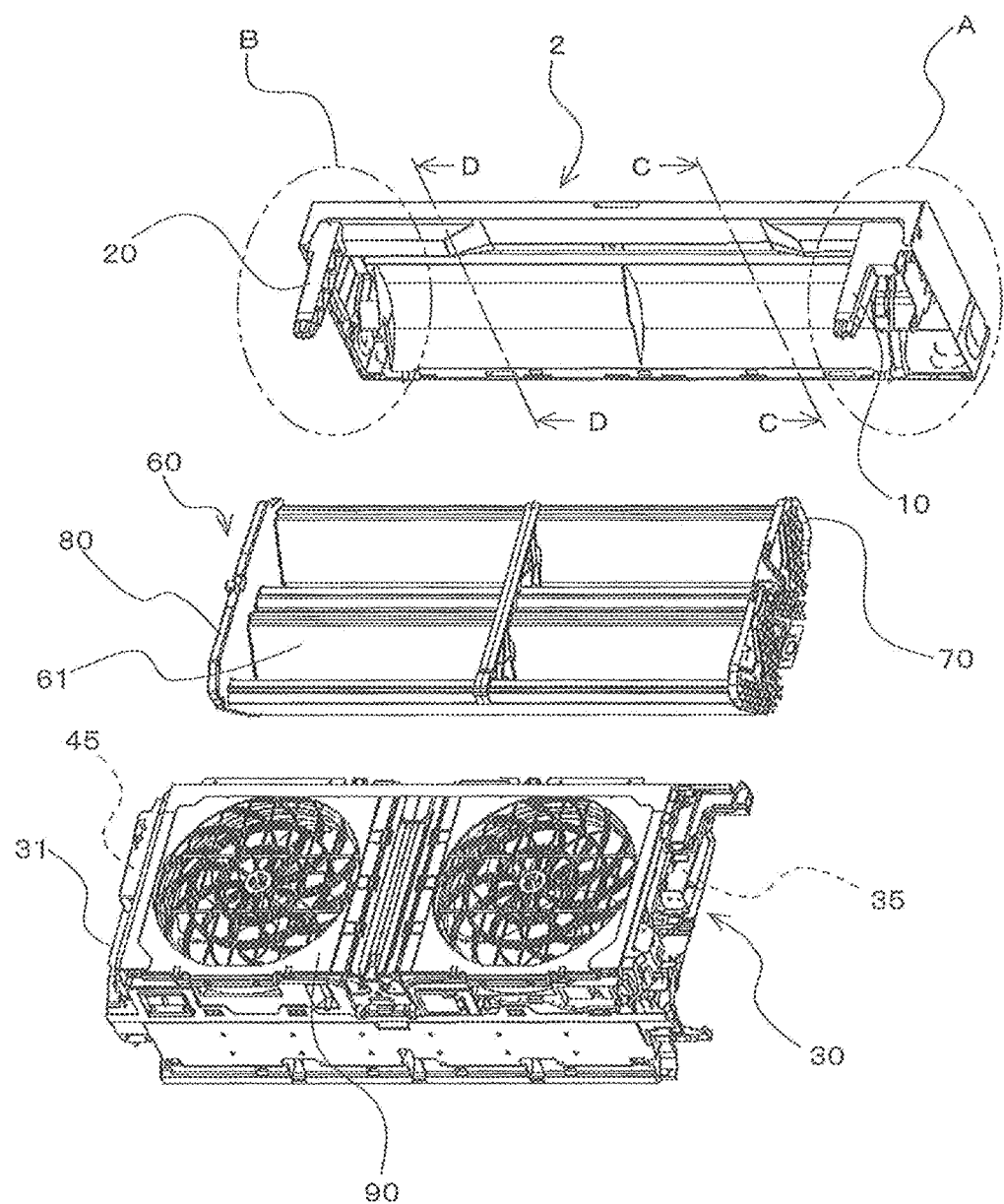
FIG. 7 is an exploded perspective view of the back plate, the heat exchanger, and the fan unit, seen from the upper right front side, in the indoor unit of the air-conditioning apparatus according to the embodiment of the present invention.
Figure 8:
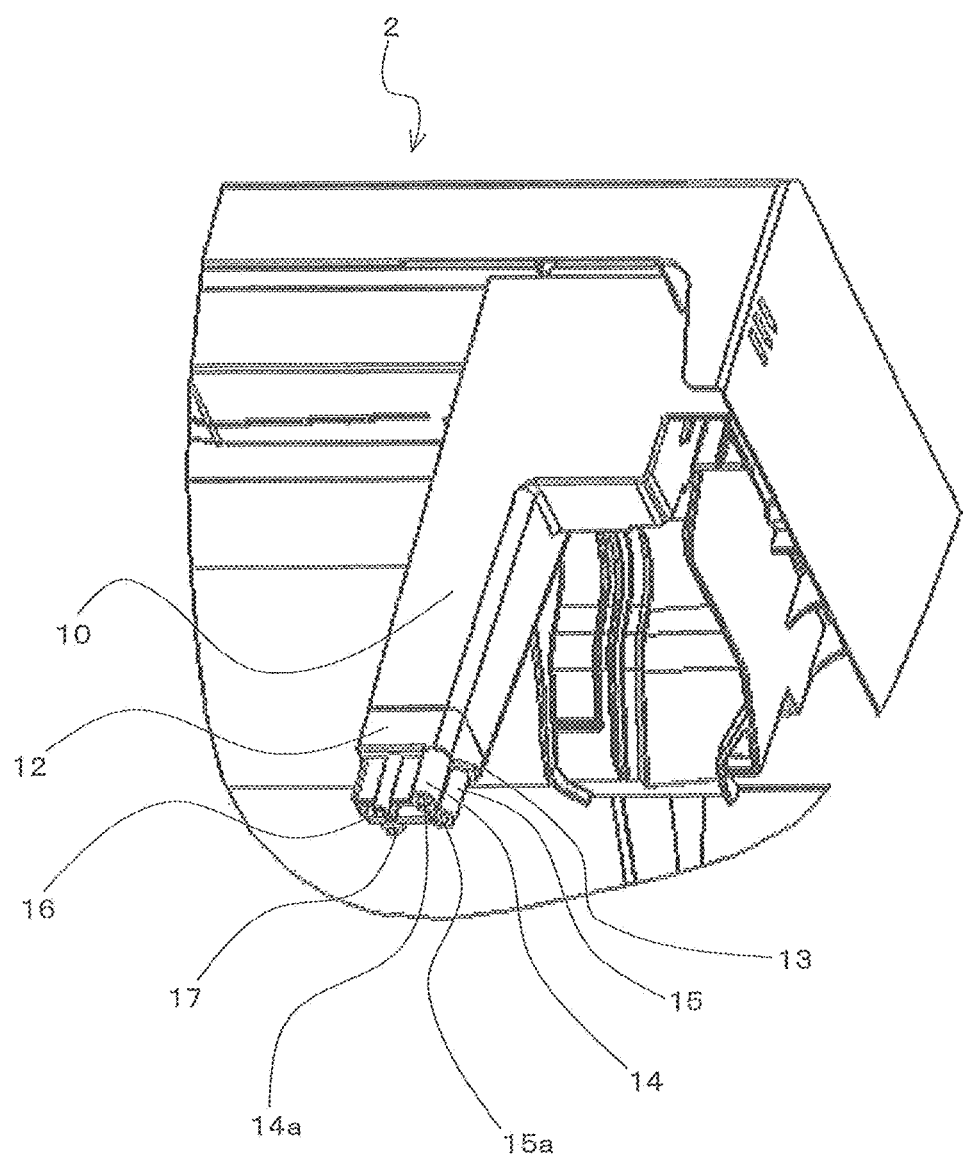
FIG. 8 is an enlarged view of a part A of FIG. 7.
Figure 9:
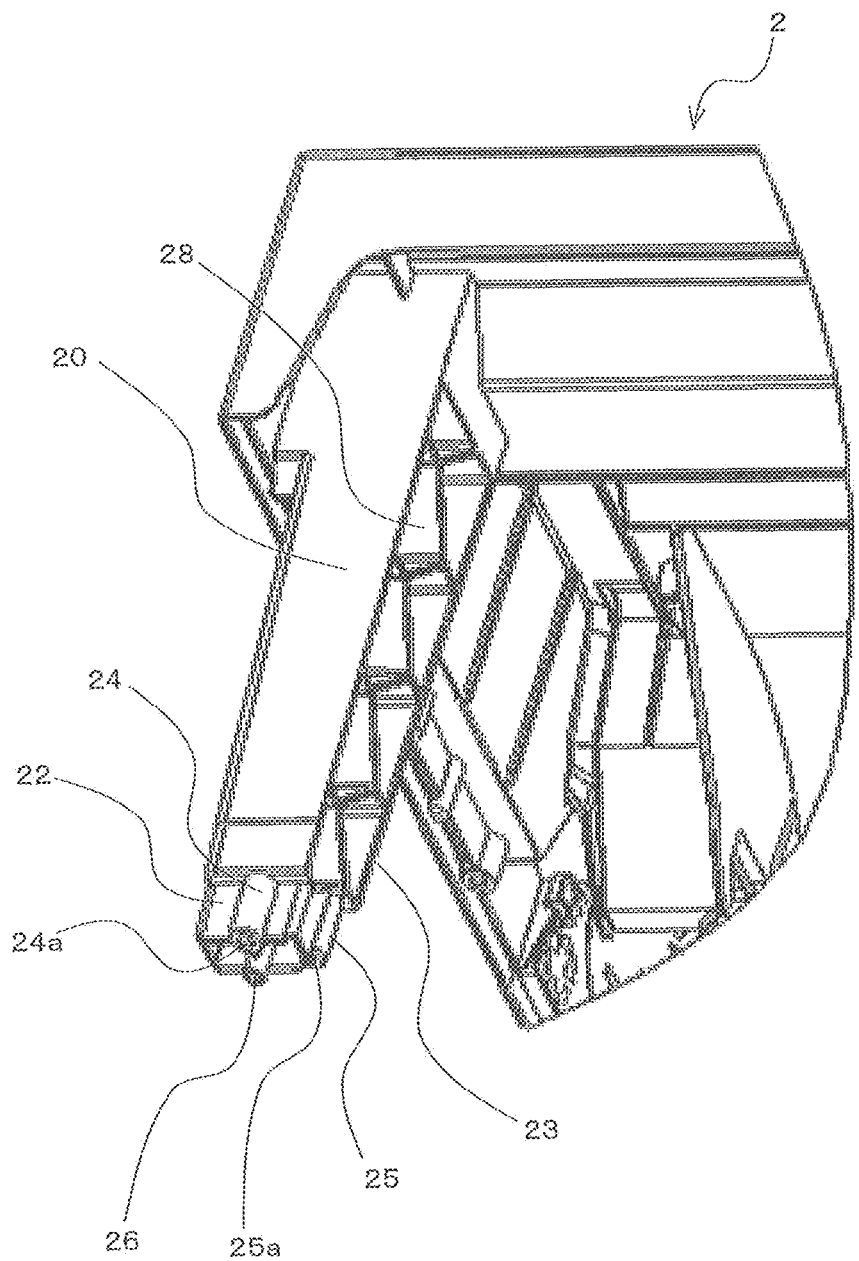
FIG. 9 is an enlarged view of a part B of FIG. 7.
Figure 10:
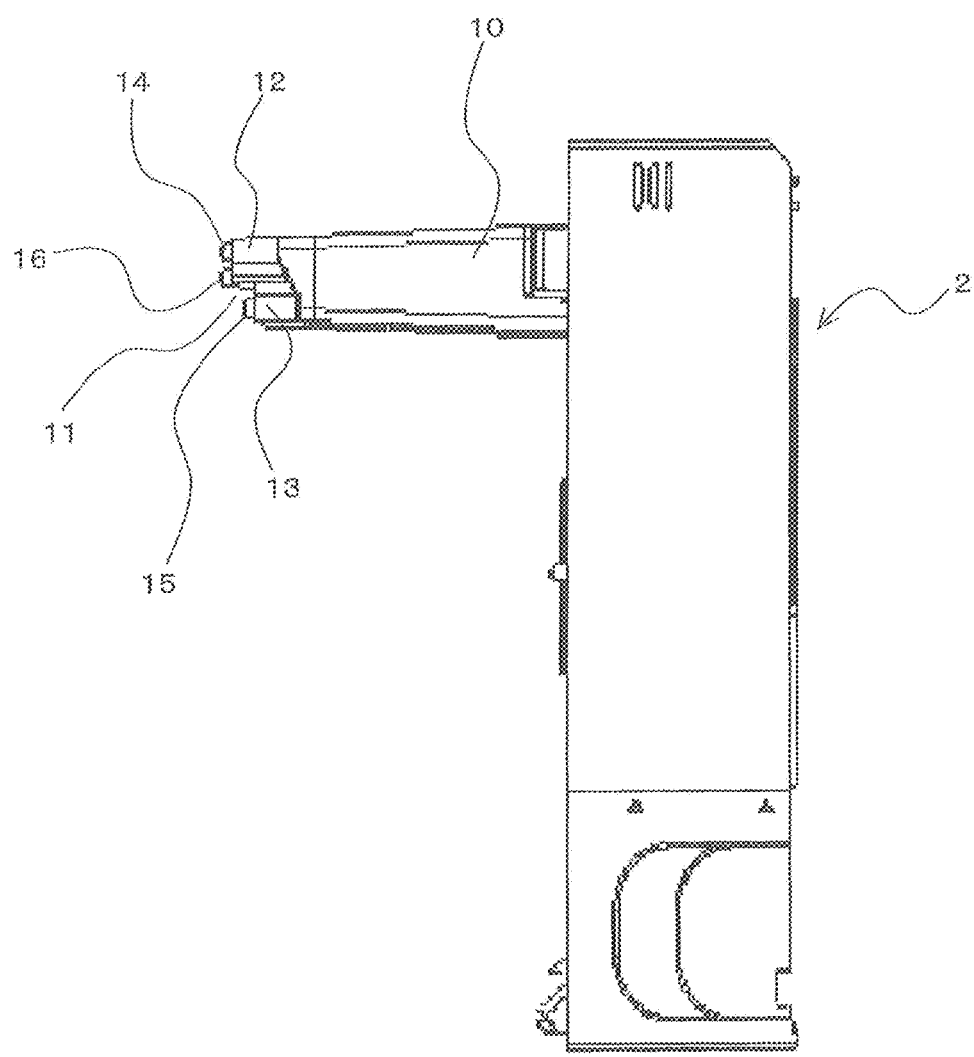
FIG. 10 is a right side view of the back plate of the indoor unit of the air-conditioning apparatus according to the embodiment of the present invention.
Figure 11:
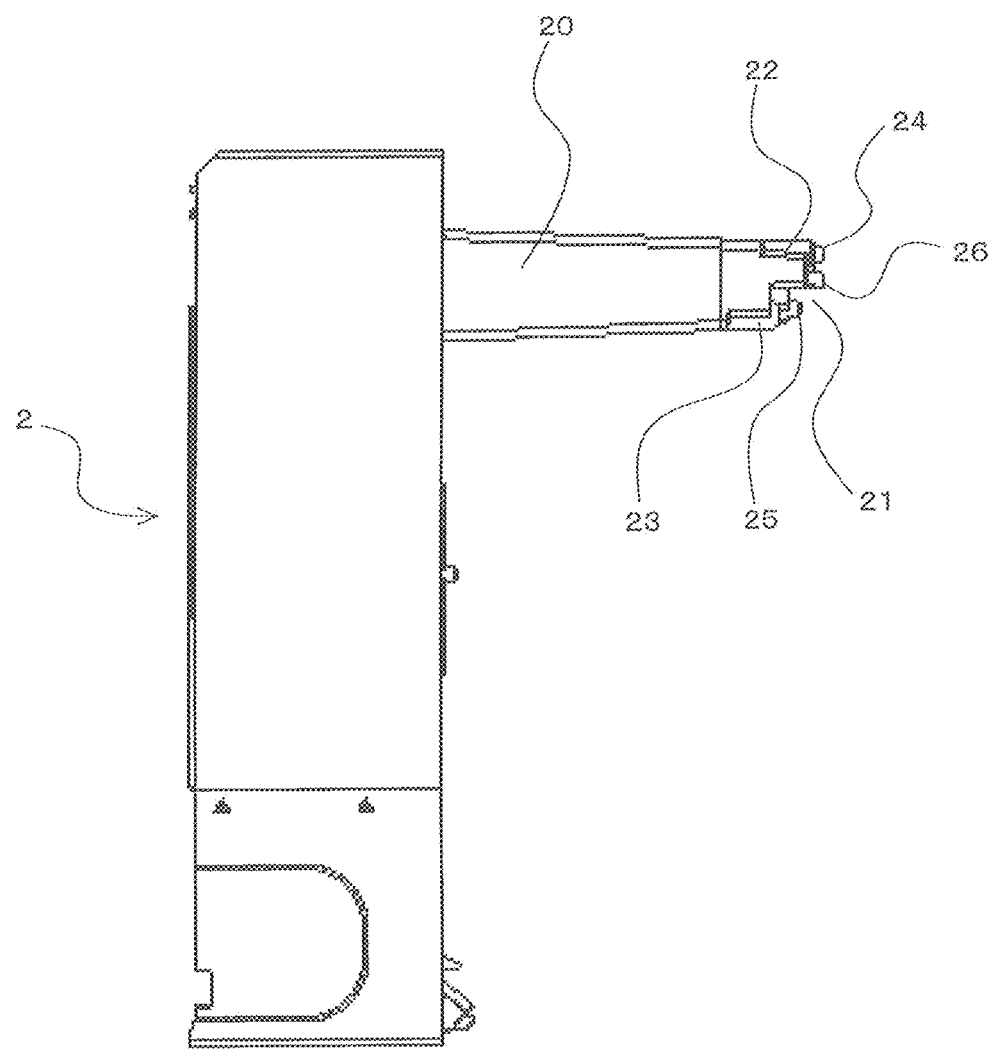
FIG. 11 is a left side view of the back plate of the indoor unit of the air-conditioning apparatus according to the embodiment of the present invention.
Figure 12:
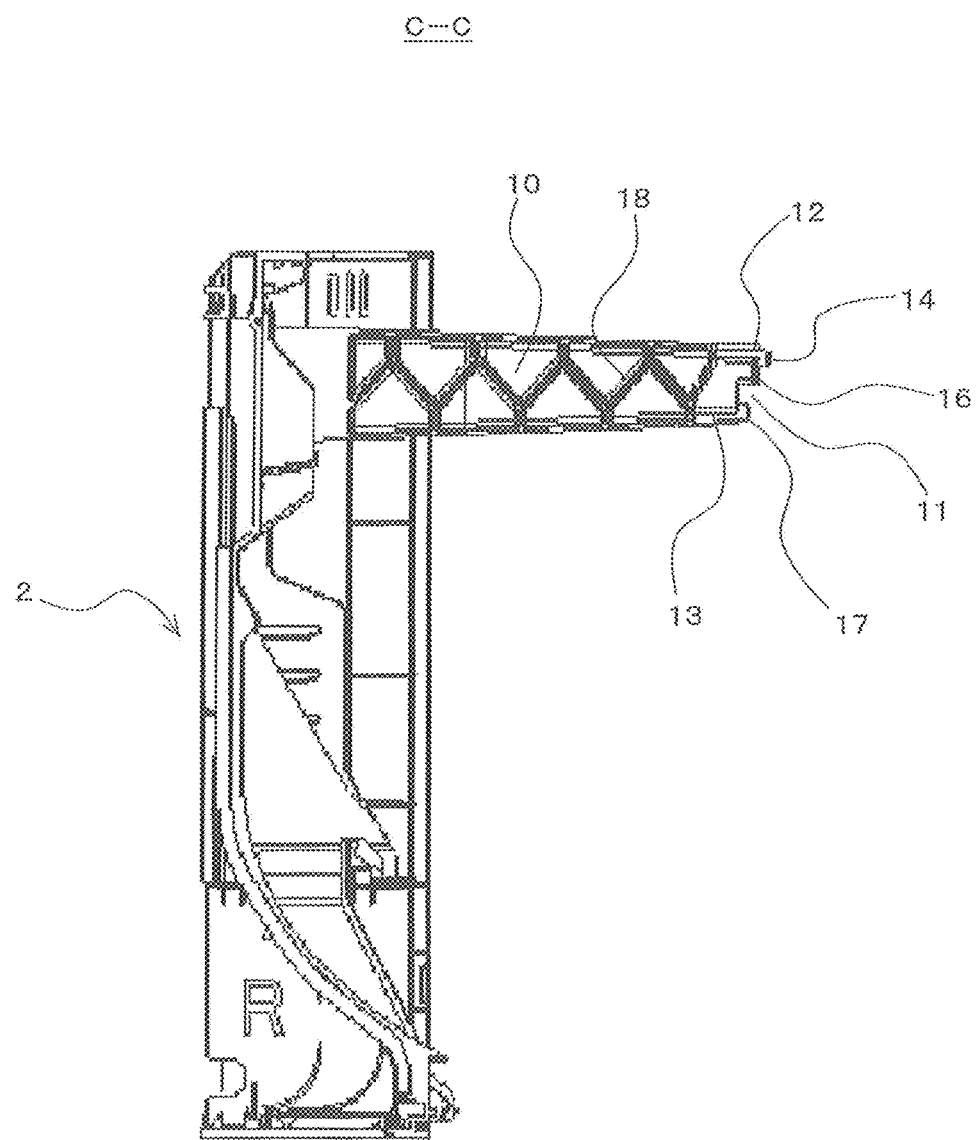
FIG. 12 is a C-C sectional view of FIG. 7.
Figure 13:
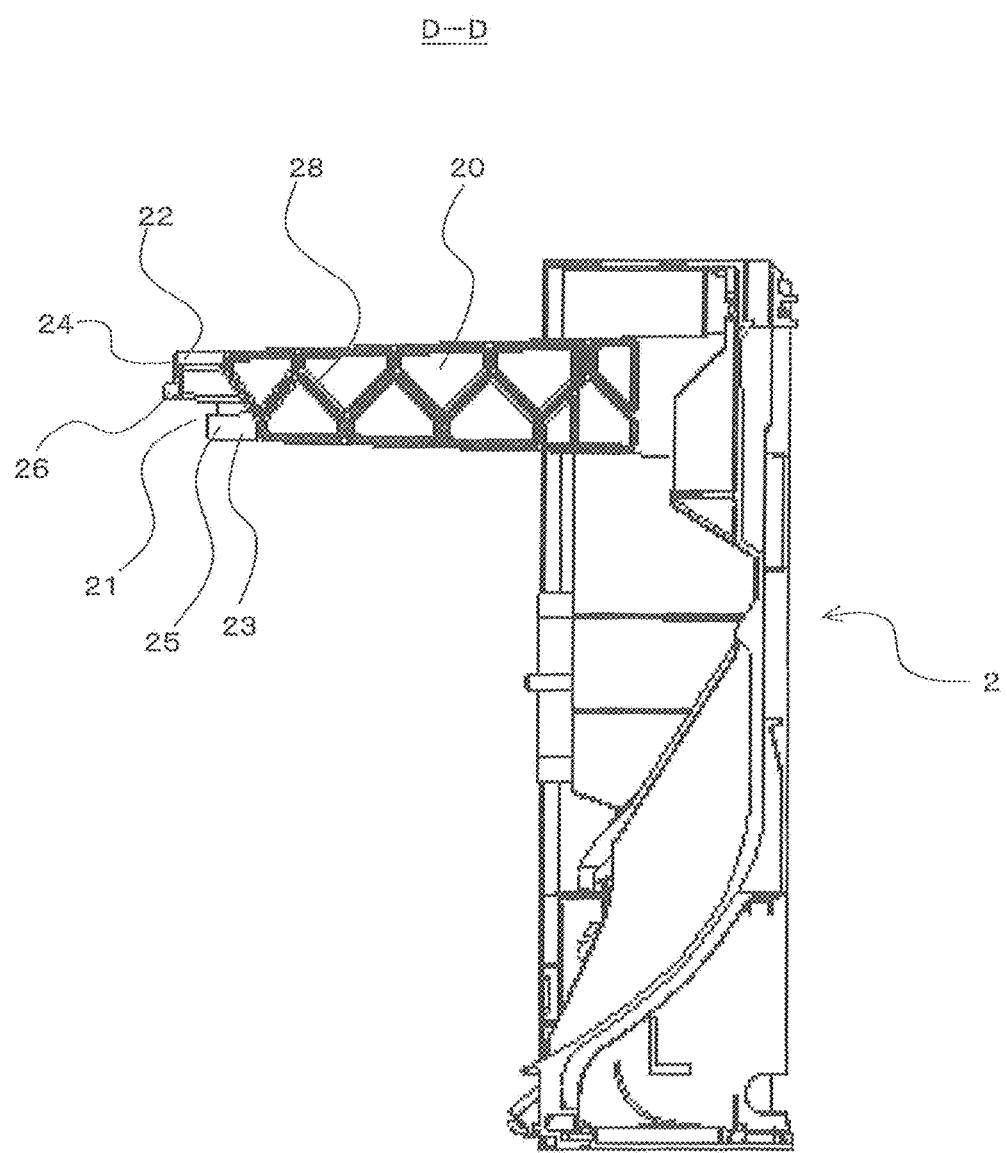
FIG. 13 is a D-D sectional view of FIG. 7.
Figure 14:
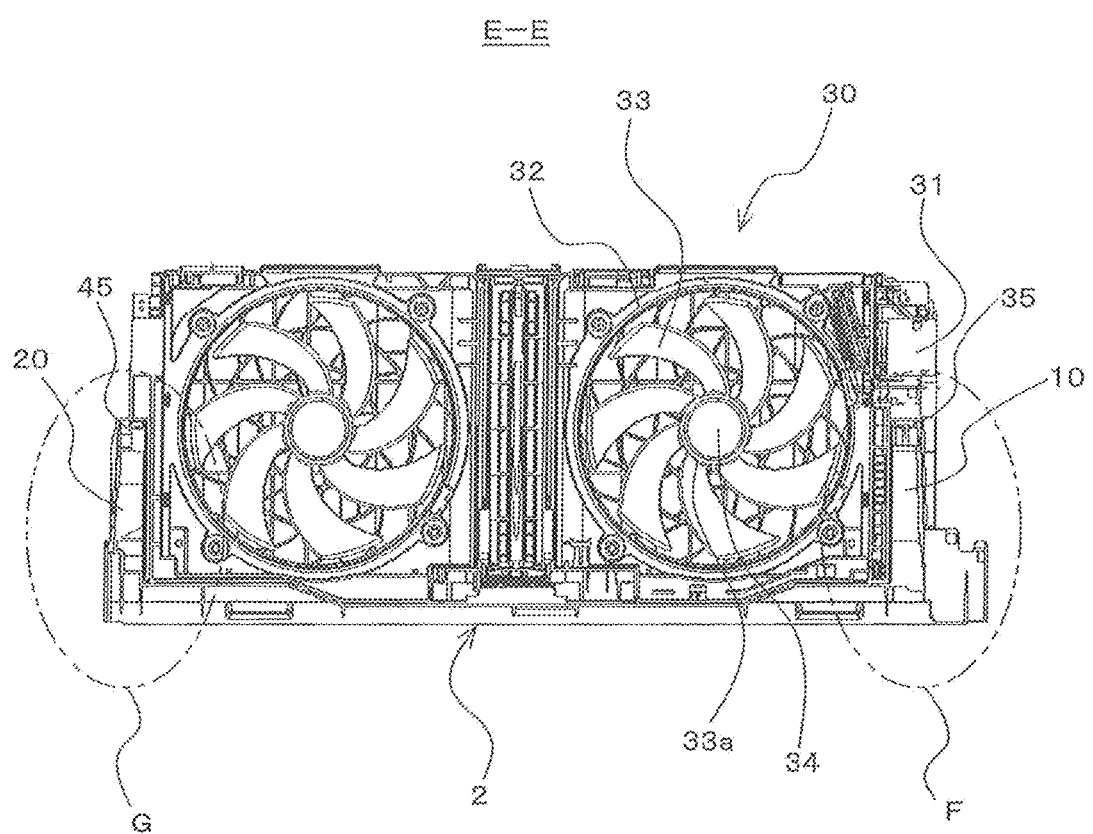
FIG. 14 is an E-E sectional view of FIG. 2.
Figure 15:
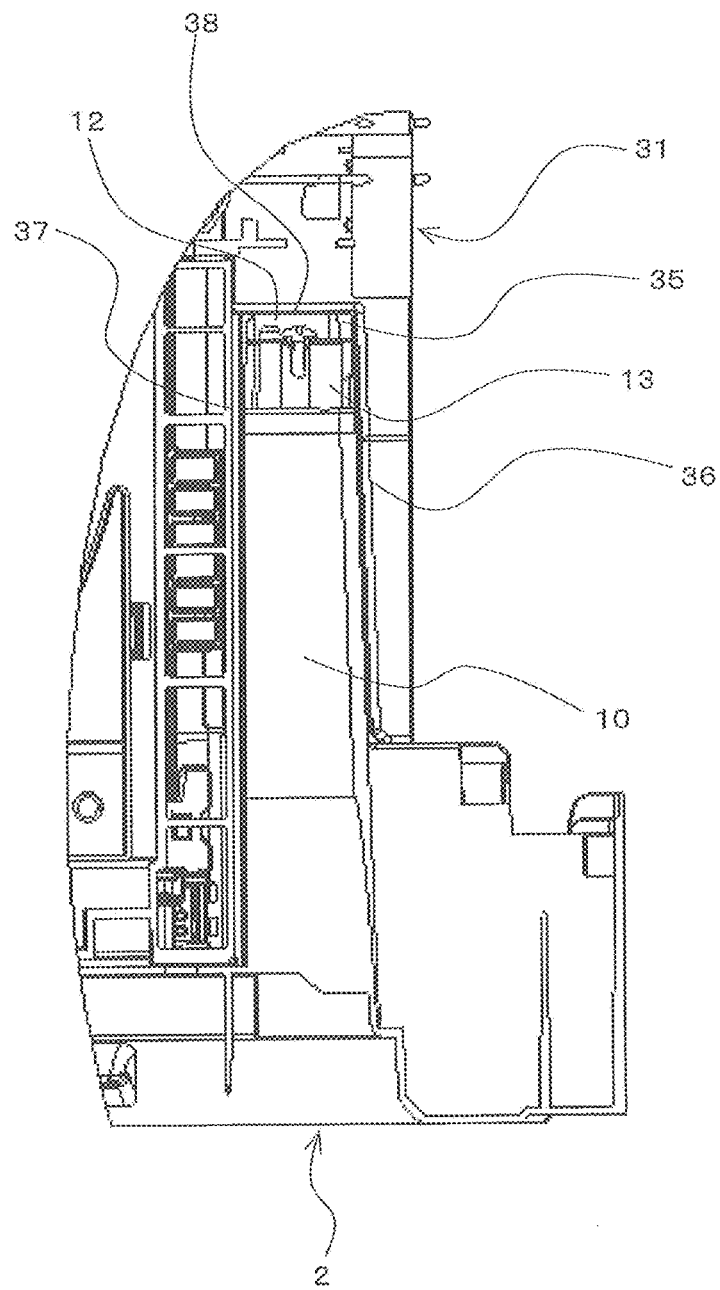
FIG. 15 is an enlarged view of a part F of FIG. 14.
Figure 16:
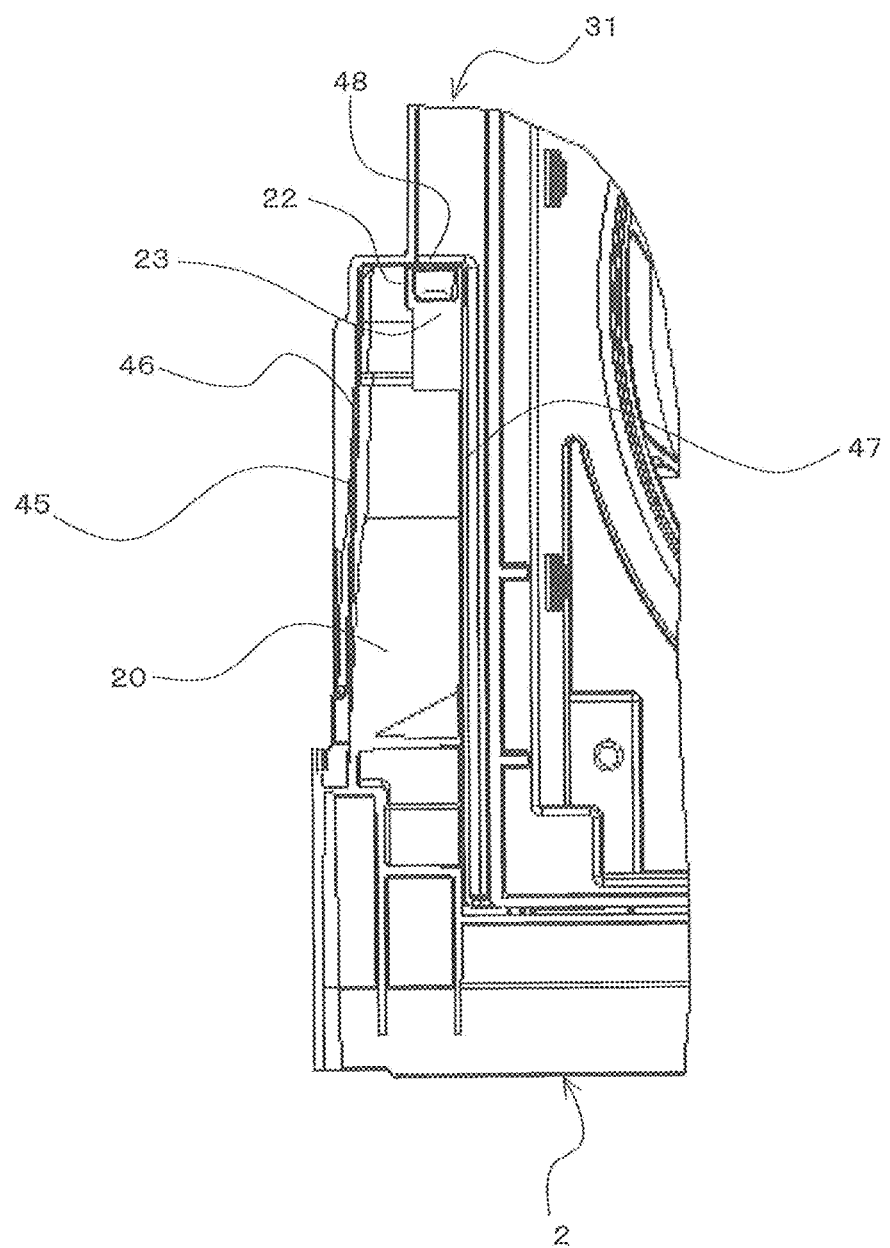
FIG. 16 is an enlarged view of a part G of FIG. 14.

FIG. 6 is an assembly perspective view of the back plate, the heat exchanger, and the fan unit, seen from the upper right front side, in the indoor unit of the air-conditioning apparatus according to the embodiment of the present invention. FIG. 7 is an exploded perspective view of the back plate, the heat exchanger, and the fan unit, seen from the upper right front side, in the indoor unit of the air-conditioning apparatus. FIG. 8 is an enlarged view of a part A of FIG. 7. FIG. 9 is an enlarged view of a part B of FIG. 7. FIG. 10 is a right side view of the back plate of the indoor unit of the air-conditioning apparatus. FIG. 11 is a left side view of the back plate of the indoor unit of the air-conditioning apparatus. FIG. 12 is a C-C sectional view of FIG. 7. FIG. 13 is a D-D sectional view of FIG. 7. FIG. 14 is an E-E sectional view of FIG. 2. FIG. 15 is an enlarged view of a part F of FIG. 14. Further, FIG. 16 is an enlarged view of a part G of FIG. 14.

It should be noted that in FIG. 6 and FIG. 7, the cleaning unit 90 supported by the fan unit 30 is also shown.

As shown in FIGS. 6, 7, and elsewhere, the back plate 2 includes the pair of support arms 10 and 20 protruding forward. As shown in FIGS. 8, 10, 12, and elsewhere, the support arm 10 provided in a protruding manner on the right side of the back plate 2 is formed in a substantially square pole shape. Further, the inside of the support arm 10 is in a hollow shape to reduce the weight, and a rib 18 is formed inside to thereby secure the strength of the support arm 10.

It should be noted that in the present embodiment, one side face (left side face facing the center side of the casing 1) of the support arm 10 is opened. In the present embodiment, one in which one side face is opened in this way is also referred to as a prism shape.

Further, the support arm 10 has a step 11 formed at a tip portion thereof. As such, the tip portion of the support arm 10 includes a first tip portion 12, and a second tip portion 13 arranged backward by the step 11 from the first tip portion 12.

The first tip portion 12 is provided with a boss 14 protruding forward, and a positioning pin 16. Further, the boss 14 has a screw hole 14a for fixing the fan unit 30. The positioning pin 16 is used for positioning the fan unit 30 before fixing the fan unit 30 with a screw.

Here, the screw hole 14a corresponds to a first screw hole of the present invention.

The second tip portion 13 includes a boss 15 protruding forward, and a positioning pin 17. Further, the boss 15 has a screw hole 15a for fixing the heat exchanger 60. The positioning pin 17 is used for positioning the heat exchanger 60 before fixing the heat exchanger 60 with a screw.

As shown in FIGS. 9, 11, 13, and elsewhere, the support arm 20 provided in a protruding manner on the left side of the back plate 2 is also formed to be in an almost similar shape to that of the support arm 10. In more detail, the support arm 20 is formed to be in a substantially square pole shape. Further, the inside of the support arm 20 is in a hollow shape to reduce the weight, and a rib 28 is formed inside to thereby secure the strength of the support arm 20.

Further, the support arm 20 has a step 21 formed at a tip portion thereof. As such, the tip portion of the support arm 20 includes a first tip portion 22, and a second tip portion 23 arranged backward by the step 21 from the first tip portion 22.

The first tip portion 22 is provided with a boss 24 protruding forward, and a positioning pin 26. Further, the boss 24 has a screw hole 24a for fixing the fan unit 30. The positioning pin 26 is used for positioning the fan unit 30 before fixing the fan unit 30 with a screw.

Here, the screw hole 24a corresponds to the first screw hole of the present invention.

The second tip portion 23 includes a boss 25 protruding forward. Further, the boss 25 has a screw hole 25a for fixing the heat exchanger 60. It should be noted that the boss 25 also functions as a positioning pin for positioning the heat exchanger 60 before fixing the heat exchanger 60 with a screw, as described below.

Here, the boss 25 corresponds to a positioning pin of the present invention.

It should be noted that the shape of the support arms 10 and 20 is not limited to a substantially square pole shape. For example, the support arms 10 and 20 may be formed in the shape of a substantially columnar shape or a substantially prism shaper other than a substantially square pole shape. However, it is preferable that the support arms 10 and 20 are in a substantially prism shape because they are able to support the fan unit 30 by surface contact.

As shown in FIGS. 14, 15, and 16, on the lower face of the fan outer frame 31 of the fan unit 30, a guide groove 35 is formed along a front and back direction at a position facing the upper part of the support arm 10 formed on the right side of the back plate 2. Further, on the lower face of the fan outer frame 31 of the fan unit 30, a guide groove 45 is formed along a front and back direction at a position facing the upper part of the support arm 20 formed on the left side of the back plate 2.

The guide groove 35, into which the support arm 10 is inserted slidably in a front and back direction, is formed between an outer guide wall 36 and an inner guide wall 37 protruded upward from the lower face of the fan outer frame 31. Further, the front face side of the guide groove 35 is closed at least partially by a mounting plate 38. This means that the guide groove 35 is in a form that the lower side and the back side are opened. Further, the mounting plate 38 is arranged to face the front of the support arm 10, that is, the tip portion (in more detail, the first tip portion 12) of the support arm 10. In the mounting plate 38, a through hole 39 is formed at a position facing the screw hole 14a formed in the boss 14 of the first tip portion 12. Further, in the mounting plate 38, a positioning hole 40 (through hole) is formed at a position facing the positioning pin 16 of the first tip portion 12 (see FIG. 6). Here, the through hole 39 corresponds to a first through hole of the present invention, and the positioning hole 40 corresponds to a first recess of the present invention. It should be noted that the positioning hole 40 is not necessarily pierced.

The guide groove 45, into which the support arm 20 is inserted slidably in a front and back direction, is formed between the outer guide wall 46 and the inner guide wall 47 protruded upward from the lower surface of the fan outer frame 31 (see FIG. 5). Further, the front face side of the guide groove 45 is closed at least partially by a mounting plate 48. This means that the guide groove 45 is in a form that the lower side and the back side are opened. Further, the mounting plate 48 is arranged to face the front of the support arm 20, that is, the tip portion (in more detail, the first tip portion 22) of the support arm 20. In the mounting plate 48, a through hole 49 is formed at a position facing the screw hole 24a formed in the boss 24 of the first tip portion 22. Further, in the mounting plate 48, a positioning hole 50 (through hole) is formed at a position facing the positioning pin 26 of the first tip portion 22 (see FIG. 6).

Here, the through hole 49 corresponds to the first through hole of the present invention, and the positioning hole 50 corresponds to the first recess of the present invention. It should be noted that the positioning hole 50 is not necessarily pierced.

As such, it is structured that by screwing and fixing the screw, inserted in the through hole 39 of the mounting plate 38, to the screw hole 14a formed in the first tip portion 12 of the support arm 10, and screwing and fixing the screw, inserted in the through hole 49 of the mounting plate 48, to the screw hole 24a formed in the first tip portion 22 of the support arm 20, the fan unit 30 supported by the support arms 10 and 20 from the below is fixed to the support arms 10 and 20. With this structure, a screw fixing work of the fan unit 30 can be performed from the front side of the casing 1, whereby the mounting operability of the fan unit 30 can be improved.

(Mounting Structure of Heat Exchanger 60)

As described above, the heat exchanger 60 is mounted on the back plate constituting the back surface of the casing. As the heat exchanger 60 is enlarged, the center of gravity of the heat exchanger 60 comes to a position separating forward from the back plate 2. As such, when the heat exchanger 60 is mounted on the back plate 2 in a conventional configuration, larger moment is applied to the screw holes of the mounting part (screw holes formed in the back plate 2) along with the enlargement of the heat exchanger 60. As such, breakage of the screw holes of the mounting part is concerned.

Further, in the indoor unit 100 of the present embodiment, it is also assumed that the back plate 2 may be made of resin with the aim of achieving weight reduction, for example. When the back plate 2 is made of resin, breakage of the screw holes of the mounting part is more concerned.

However, with a structure that the heat exchanger 60 is mounted on the pair of support arms 10 and 20 as shown below, it is possible to prevent breakage of the screw holes (screw holes formed in the back plate 2) of the mounting part.

The details of the mounting structure of the heat exchanger 60 will be described below with use of the drawings.

Figure 17:
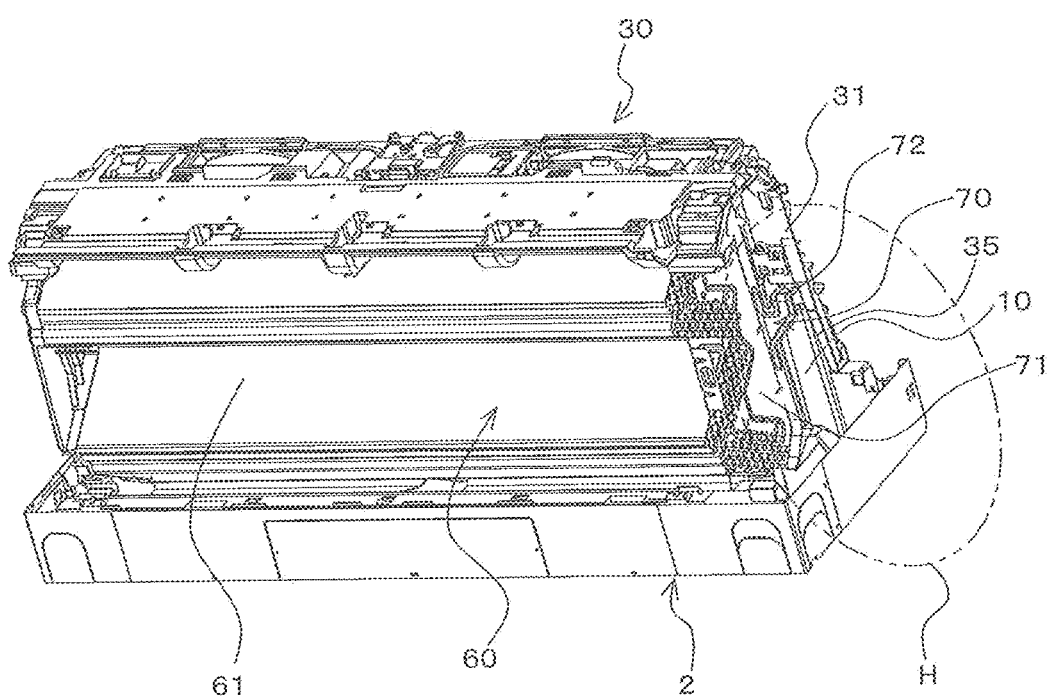
FIG. 17 is an assembly perspective view of the back plate, the heat exchanger, and the fan unit, seen from the lower right front side, in the indoor unit of the air-conditioning apparatus according to the embodiment of the present invention.
Figure 18:
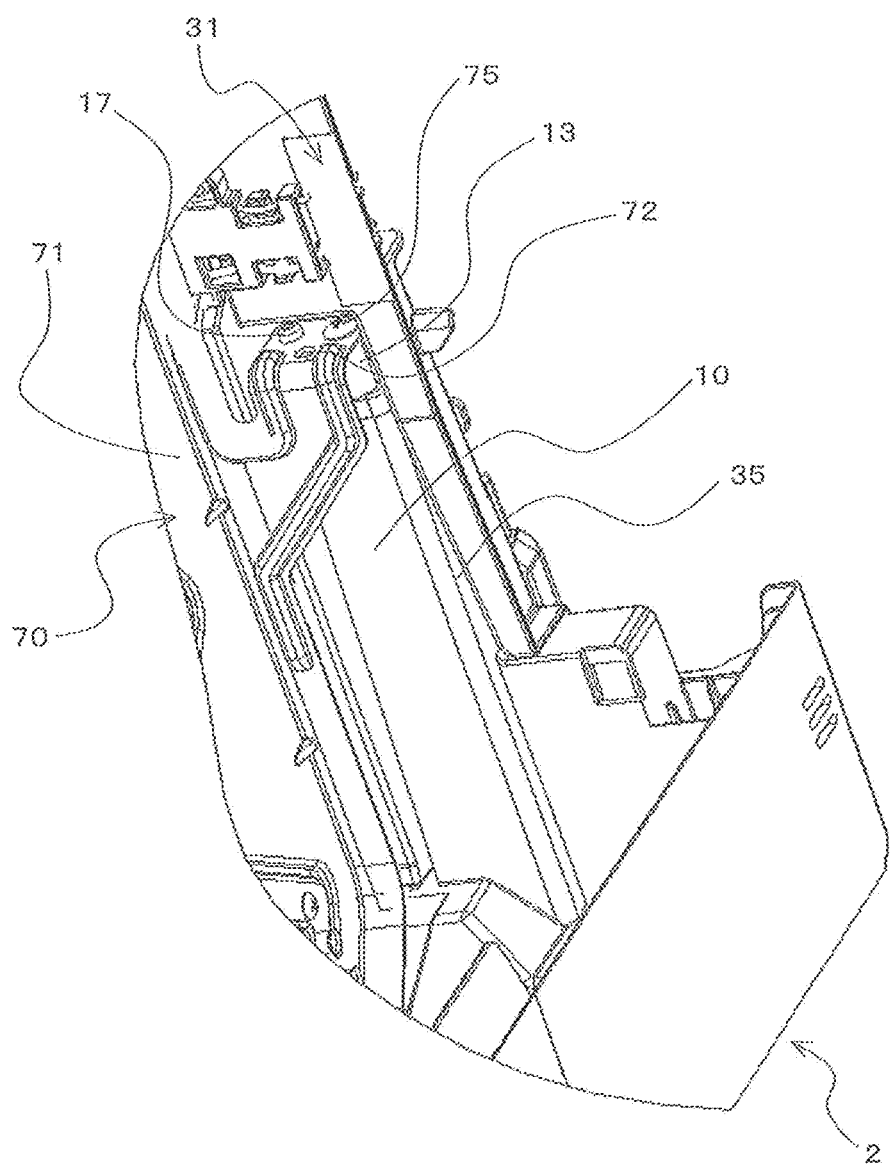
FIG. 18 is an enlarged view of a part H of FIG. 17.
Figure 19:
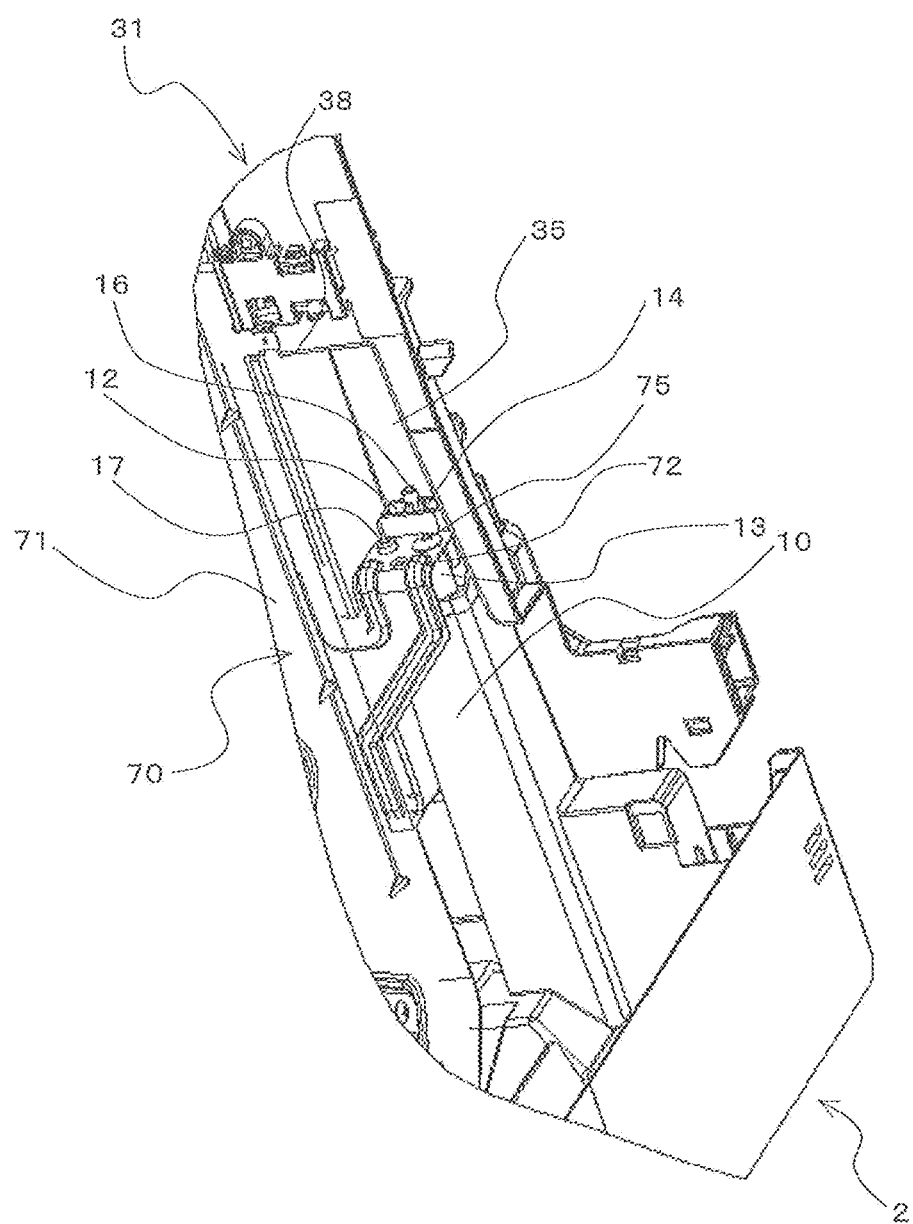
FIG. 19 is a drawing showing a state where the fan unit is drawn forward from the state shown in FIG. 18.
Figure 20:
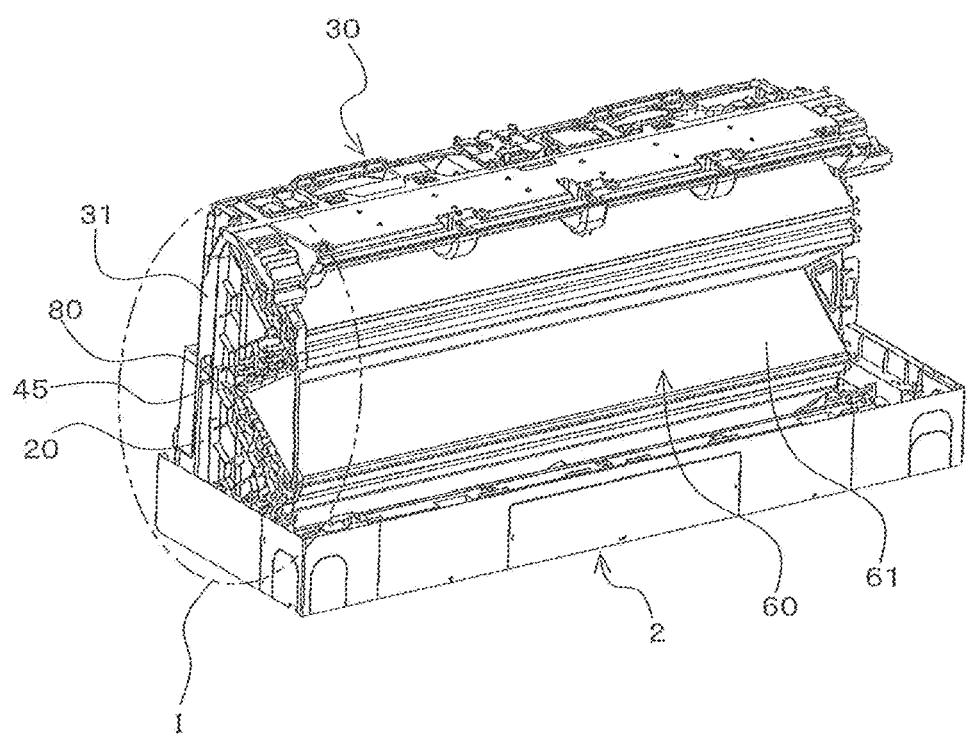
FIG. 20 is an assembly perspective view of the back plate, the heat exchanger, and the fan unit, seen from the lower left front side, in the indoor unit of the air-conditioning apparatus according to the embodiment of the present invention.
Figure 21:
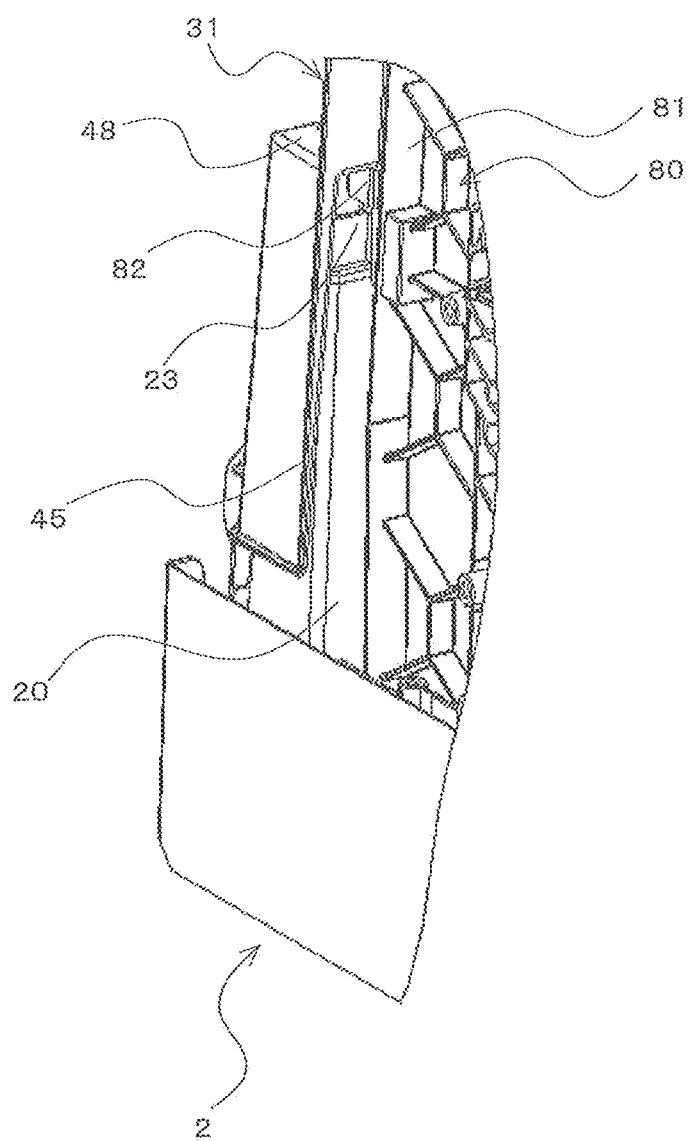
FIG. 21 is an enlarged view of a part I of FIG. 20.
Figure 22:
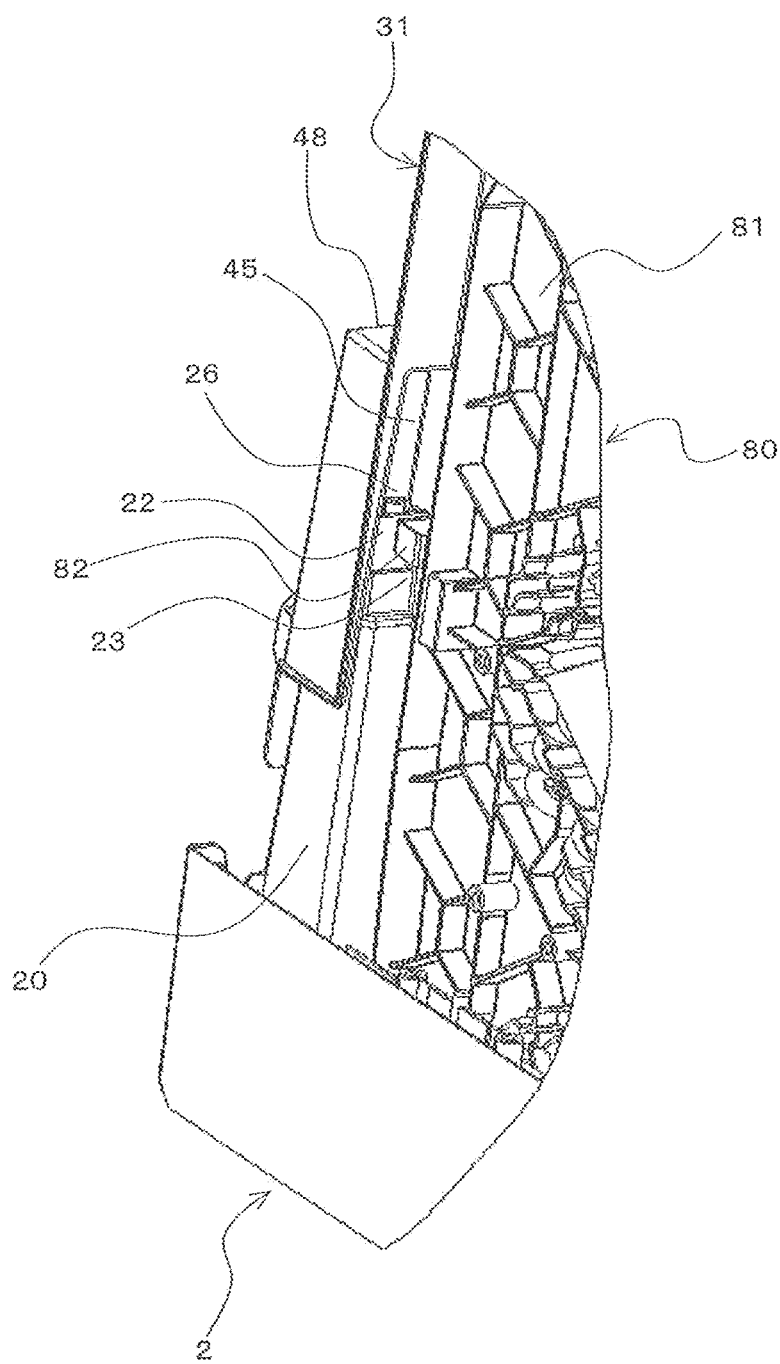
FIG. 22 is a drawing showing a state where the fan unit is drawn forward from the state shown in FIG. 21.
Figure 23:
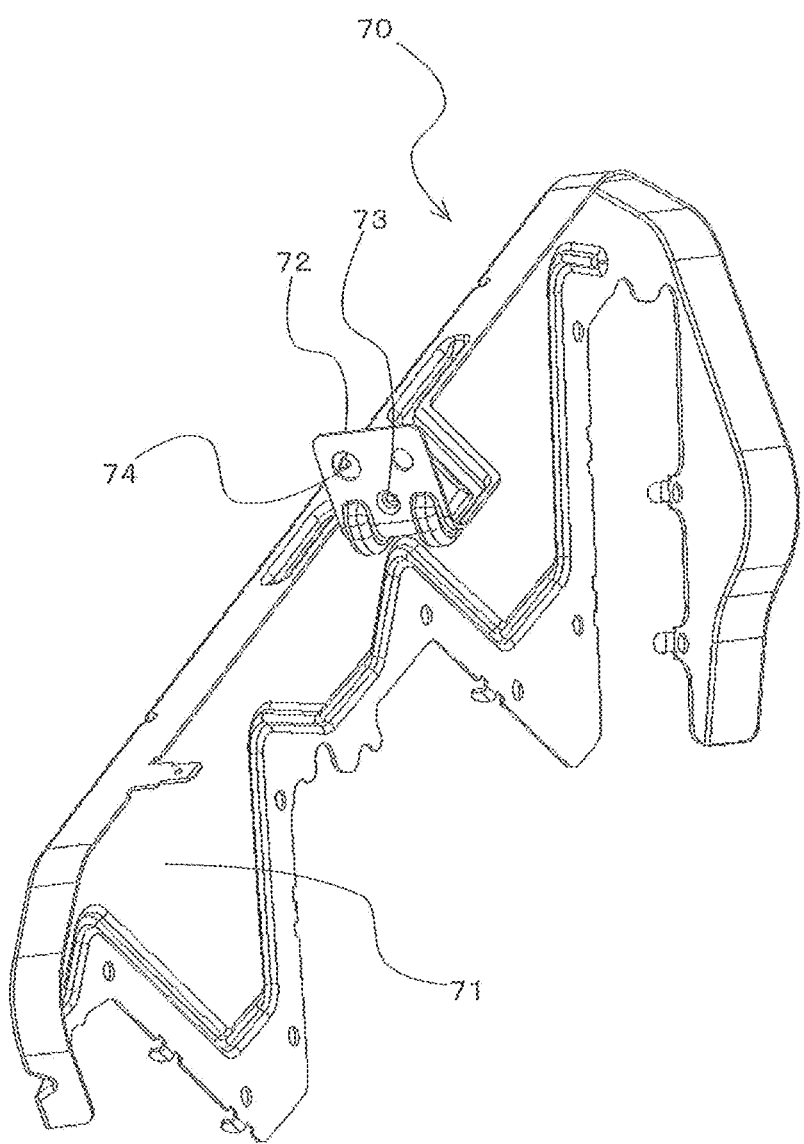
FIG. 23 is a perspective view of a right side plate of the heat exchanger, seen from the upper right front side, in the indoor unit of the air-conditioning apparatus according to the embodiment of the present invention.
Figure 24:
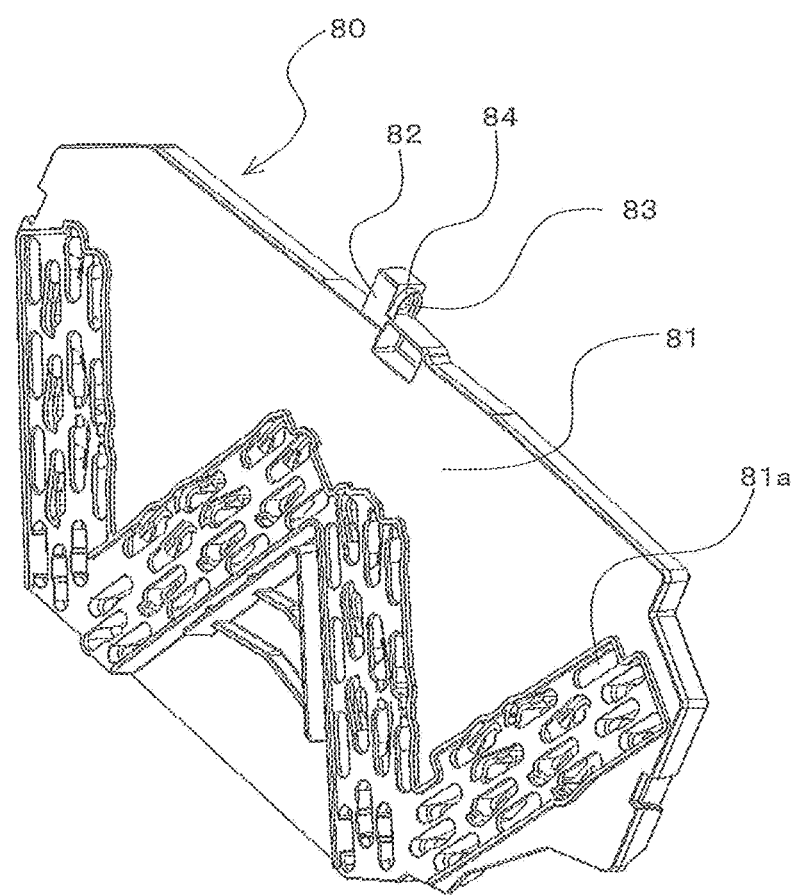
FIG. 24 is a perspective view of a left side plate of the heat exchanger, seen from the upper right back side, in the indoor unit of the air-conditioning apparatus according to the embodiment of the present invention.

FIG. 17 is an assembly perspective view of the back plate, the heat exchanger, and the fan unit, seen from the lower right front side, in the indoor unit of the air-conditioning apparatus according to the embodiment of the present invention. FIG. 18 is an enlarged view of a part H of FIG. 17. FIG. 19 is a drawing showing a state where the fan unit is drawn forward from the state shown in FIG. 18. FIG. 20 is an assembly perspective view of the back plate, the heat exchanger, and the fan unit, seen from the lower left front side, in the indoor unit of the air-conditioning apparatus. FIG. 21 is an enlarged view of a part I of FIG. 20. FIG. 22 is a drawing showing a state where the fan unit is drawn forward from the state shown in FIG. 21. FIG. 23 is a perspective view of the right side plate of the heat exchanger, seen from the upper right front side, in the indoor unit of the air-conditioning apparatus. Further, FIG. 24 is a perspective view of the left side plate of the heat exchanger, seen from the upper right back side, in the indoor unit of the air-conditioning apparatus.

As shown in FIGS. 17, 18, 19, and 23, the right side plate 70 provided to the right end of the heat exchanger main body 61 includes a side plate main body 71 connected to the heat exchanger main body 61, and a mounting part 72 protruded upward from the side plate main body 71. The side plate main body 71 is connected to the right end of the heat exchanger main body 61 by welding, for example. The mounting part 72 is arranged to face the front of the support arm 10, that is, the tip portion (in more detail, the second tip portion 13) of the support arm 10. In the mounting part 72, a through hole 73 is formed at a position facing the screw hole 15a formed in the boss 15 of the second tip portion 13. Further, in the mounting part 72, a positioning hole 74 (through hole) is formed at a position facing the positioning pin 17 of the second tip portion 13.

Here, the through hole 73 corresponds to a second through hole of the present invention, and the positioning hole 74 corresponds to a second recess of the present invention. It should be noted that the positioning hole 74 is not necessarily pieced.

As shown in FIGS. 20, 21, 22, and 24, the left side plate 80 provided to the left end of the heat exchanger main body 61 includes a side plate main body 81 connected to the heat exchanger main body 61, and a mounting part 82 protruded upward from the side plate main body 81. At the left end of the heat exchanger main body 61, two heat transfer pipes 68 are connected with each other by a U-shaped pipe. On the other hand, in the side plate main body 81, a heat transfer pipe holding hole 81a is formed at a position facing the U-shaped pipe. By inserting the U-shaped pipe into the heat transfer pipe holding hole 81a, the side plate main body 81 is connected to the left end of the heat exchanger main body 61. The mounting part 82 is arranged to face the front of the support arm 20, that is, the tip portion (in more detail, the second tip portion 23) of the support arm 20. In the mounting part 82, a through hole 83 is formed at a position facing the screw hole 25a formed in the boss 25 of the second tip portion 23. Further, in the mounting part 82, a flange 84 protruding backward (back plate 2 side) is formed on the outer periphery of the through hole 83. This means that a recess, with the flange 84 being the outer peripheral wall, is formed behind the through hole 83. It is configured that in the recess, a tip portion of the boss 25, formed on the second tip portion 23 of the support arm 20, is inserted.

Here, the through hole 83 corresponds to the second through hole of the present invention, and the recess with the flange 84 being the outer peripheral wall corresponds to the second recess of the present invention.

As such, it is structured that by screwing and fixing a screw 75, inserted in the through hole 73 of the mounting part 72, to the screw hole 15a formed in the second tip portion 13 of the support arm 10, and screwing and fixing a screw, inserted in the through hole 83 of the mounting part 82, to the screw hole 25a formed in the second tip portion 23 of the support arm 20, the heat exchanger 60 is fixed to the support arms 10 and 20. With this structure, the screw fixing work of the heat exchanger 60 can be performed from the front side of the casing 1, whereby the mounting operability of the heat exchanger 60 can be improved.

(Mounting Operation of Fan Unit 30 and Heat Exchanger 60)

Mounting operation of the fan unit 30 and the heat exchanger 60, structured as described above, is performed by the procedures as described below.

In the case of mounting the fan unit 30 and the heat exchanger 60 on the support arms 10 and 20 of the back plate 2, the heat exchanger 60 is mounted first.

In the case of mounting the heat exchanger 60 on the support arms 10 and 20, the positioning pin 17 provided to the second tip portion 13 of the support arm 10 is inserted to the positioning hole 74 formed in the mounting part 72 of the right side plate 70. Further, the boss 25 provided to the second tip portion 23 of the support arm 20 is inserted to the recess, in which the flange 84 forms the outer peripheral wall, formed in the mounting part 82 of the left side plate 80. Thereby, the heat exchanger 60 can be temporarily positioned with respect to the support arms 10 and 20, which makes the screw fixing work described below easy. This means that positioning between the through hole 73 of the mounting part 72 of the right side plate 70 and the screw hole 15a of the second tip portion 13 of the support arm 10, and positioning between the through hole 83 of the mounting part 82 of the left side plate 80 and the screw hole 25a of the second tip portion 23 of the support arm 20 can be performed with ease.

After the heat exchanger 60 is temporarily positioned with respect to the support arms 10 and 20, the heat exchanger 60 is fixed to the support arms 10 and 20 with the screws. In more detail, the screw 75, inserted in the through hole 73 of the mounting part 72 of the right side plate 70, is screwed and fixed to the screw hole 15a formed in the second tip portion 13 of the support arm 10 (see FIGS. 18, 19, and elsewhere), and the screw inserted in the through hole 83 of the mounting part 82 of the left side plate 80, is screwed and fixed to the screw hole 25a formed in the second tip portion 23 of the support arm 20, whereby the heat exchanger 60 is fixed to the support arms 10 and 20.

Figure 25:
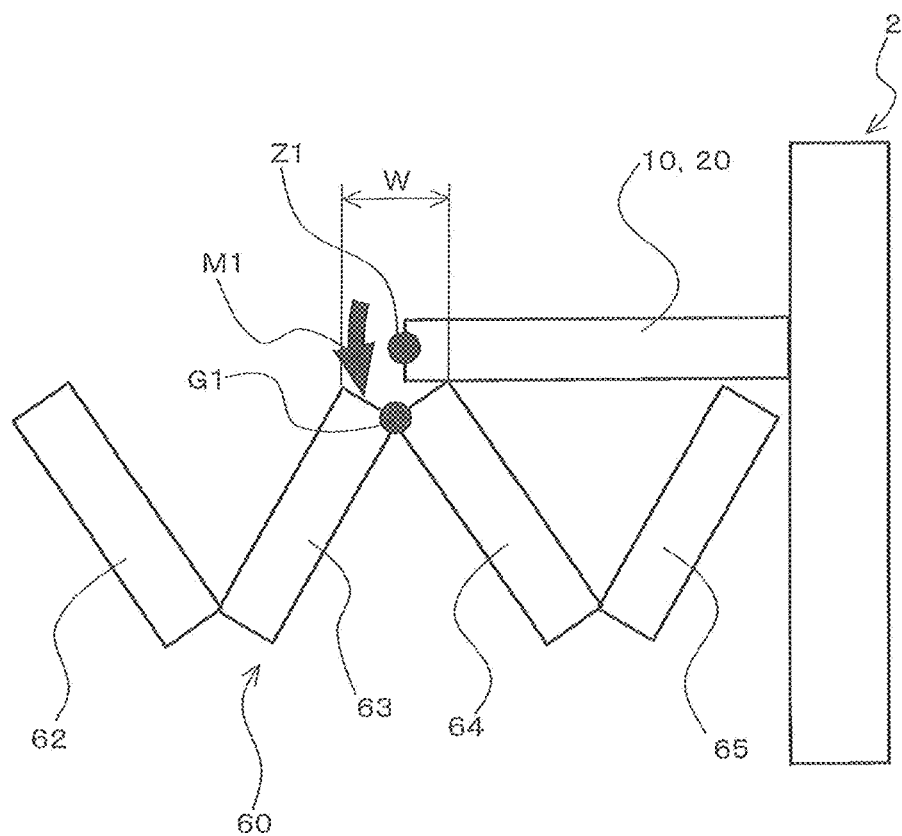
FIG. 25 is an explanatory diagram for explaining the moment acted on the screw hole of the mounting part of the heat exchanger in the indoor unit of the air-conditioning apparatus according to the embodiment of the present invention.
Figure 26:
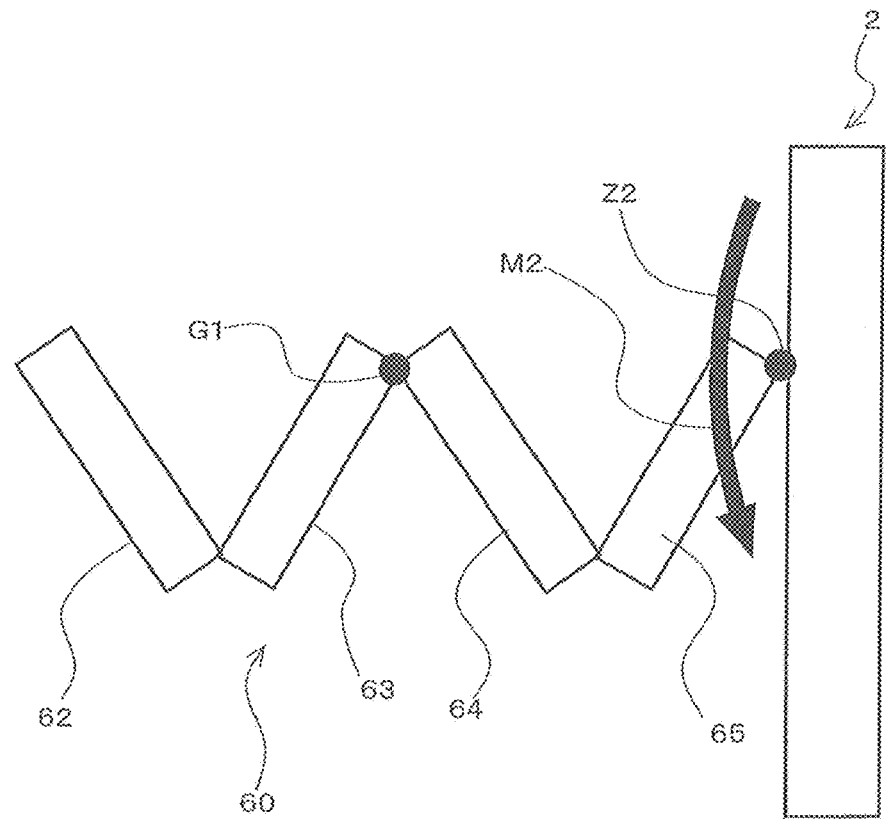
FIG. 26 is an explanatory diagram for explaining the moment acted on the screw hole of the mounting part of the heat exchanger, when a conventional mounting structure is adopted as a mounting structure of the heat exchanger, in the indoor unit of the air-conditioning apparatus according to the embodiment of the present invention.

FIG. 25 is an explanatory diagram for explaining the moment acted on the screw hole of the mounting part of the heat exchanger in the indoor unit of the air-conditioning apparatus according to the embodiment of the present invention. Further, FIG. 26 is an explanatory diagram for explaining the moment acted on the screw hole of the mounting part of the heat exchanger, when a conventional mounting structure is adopted as a mounting structure of the heat exchanger, in the indoor unit of the air-conditioning apparatus according to the embodiment of the present invention. It should be noted that a reference character G1 shown in FIG. 25 and FIG. 26 denotes the center of gravity of the heat exchanger 60.

In a conventional indoor unit, the support arms 10 and 20 as described in the present embodiment are not provided to the back plate 2. As such, when the heat exchanger 60 is mounted on the back plate 2 in the conventional mounting structure, the heat exchanger 60 is mounted at a position Z2 shown in FIG. 26. As such, the mounting position Z2 and the center of gravity G1 of the heat exchanger 60 are distant from each other, whereby the moment M2 acted on the screw hole (screw hole for fixing the heat exchanger 60) formed at the mounting position Z2 on the back plate 2 is large. As such, breakage of the screw hole is concerned.

On the other hand, in the indoor unit 100 of the present embodiment, the heat exchanger 60 is mounted on the second tip portions 13 and 23 of the support arms 10 and 20 as described above. As such, the heat exchanger 60 is mounted at a position Z1 shown in FIG. 25. As such, as the distance between the mounting position Z1 and the center of gravity G1 of the heat exchanger 60 can be shortened, the moment M1 acted on the screw holes 15a and 25a (screw holes for fixing the heat exchanger 60) formed at the mounting position Z1 of the back plate 2 can be reduced. Therefore, it is possible to prevent breakage of the screw holes 15a and 25a.

In this case, when the heat exchanger 60 is formed in a W shape when seen from a side face, it is preferable to have a structure in which the second tip portions 13 and 23 of the support arms 10 and 20 extend up to the position facing the upper end portion of the second heat exchange element 63 or the third heat exchange element 64 (a range of W shown in FIG. 25), as shown in FIG. 25. When the heat exchanger 60 is structured to have a W shape when seen from a side face, the center of gravity of the heat exchanger 60 locates near the above range of W. As such, the moment M1 acted on the screw holes 15a and 25a can be further reduced, whereby it is possible to further prevent breakage of the screw holes 15a and 25a. Particularly, in the present embodiment, the first heat exchange element 62, the second heat exchange element 63, the third heat exchange element 64, and the fourth heat exchange element 65 are formed in the same size. As such, the center of gravity of the heat exchanger 60 locates within the above range of W. As such, the moment M1 acted on the screw holes 15a and 25a can be further reduced, whereby it is possible to further prevent breakage of the screw holes 15a and 25a.

After the heat exchanger 60 is fixed to the support arms 10 and 20, the fan unit 30 is mounted on the support arms 10 and 20 of the back plate 2. At this time, first, the fan unit 30 is placed on the upper part of the support arms 10 and 20. Here, in the fan unit 30, the guide grooves 35 and 45 are formed. As such, when the fan unit 30 is placed on the upper part of the support arms 10 and 20, the support arm 10 is inserted into the guide groove 35, and the support arm 20 is inserted into the guide groove 45 (see FIGS. 19 and 22). Thereby, the fan unit 30 is temporarily positioned with respect to the support arms 10 and 20. In this way, by temporarily positioning the fan unit 30, a screw fixing work of the fan unit 30 described below can be performed with ease. This means that positioning between the through hole 39 of the mounting plate 38 and the screw hole 14a of the first tip portion 12 of the support arm 10, and positioning between the through hole 49 of the mounting plate 48 and the screw hole 24a of the first tip portion 22 of the support arm 20 can be performed with ease.

It should be noted that the fan unit 30 can be positioned temporarily if there is at least one of the guide groove 35 and the guide groove 45.

Then, when the fan unit 30 is pushed to the back plate 2, that is, when the state shown in FIGS. 19 and 22 is changed to the state shown in FIGS. 18 and 21, the mounting plate 38 is in contact with the first tip portion 12 of the support arm 10, and the mounting plate 48 is in contact with the first tip portion 22 of the support arm 20. As described above, in the support arm 10, the step 11 is formed between the first tip portion 12 and the second tip portion 13 (the heat exchanger 60 mounting part). Further, in the support arm 20, the step 21 is formed between the first tip portion 22 and the second tip portion 23 (heat exchanger 60 mounting part). As such, it is possible to prevent the mounting plate 38 from interfering with the mounting part 72 for the heat exchanger 60, and to prevent the mounting plate 48 from interfering with the mounting part 82 for the heat exchanger 60.

Further, when the mounting plate 38 is brought into contact with the first tip portion 12 of the support arm 10, the positioning pin 16, provided to the first tip portion 12 of the support arm 10, is inserted into the positioning hole 40 formed in the mounting plate 38. Similarly, when the mounting plate 48 is brought into contact with the first tip portion 22 of the support arm 20, the positioning pin 26 provided to the first tip portion 22 of the support arm 20 is inserted into the positioning hole 50 formed in the mounting plate 48. Thereby, the fan unit 30 can be temporarily positioned with respect to the support arms 10 and 20 with more accuracy. This means that positioning between the through hole 39 of the mounting plate 38 and the screw hole 14a of the first tip portion 12 of the support arm 10, and positioning between the through hole 49 of the mounting plate 48 and the screw hole 24a of the first tip portion 22 of the support arm 20 can be performed more with ease.

Here, a work of inserting the positioning pins 16 and 26 into the positioning holes 40 and 50 of the mounting plates 38 and 48 is performed in a state where the fan unit 30 is roughly positioned by the guide grooves 35 and 45 and the support arms 10 and 20. As such, a work of inserting the positioning pins 16 and 26 into the positioning holes 40 and 50 of the mounting plates 38 and 48 can also be performed with ease.

After the fan unit 30 is temporarily positioned as described above, the fan unit 30 is fixed to the support arms 10 and 20 with screws. In more detail, a screw inserted in the through hole 39 of the mounting plate 38 is screwed and fixed to the screw hole 14a formed in the first tip portion 12 of the support arm 10, and a screw inserted in the through hole 49 of the mounting plate 48, is screwed and fixed to the screw hole 24a formed in the first tip portion 22 of the support arm 20. Thereby, the fan unit 30 is fixed to the support arms 10 and 20.

Figure 27:
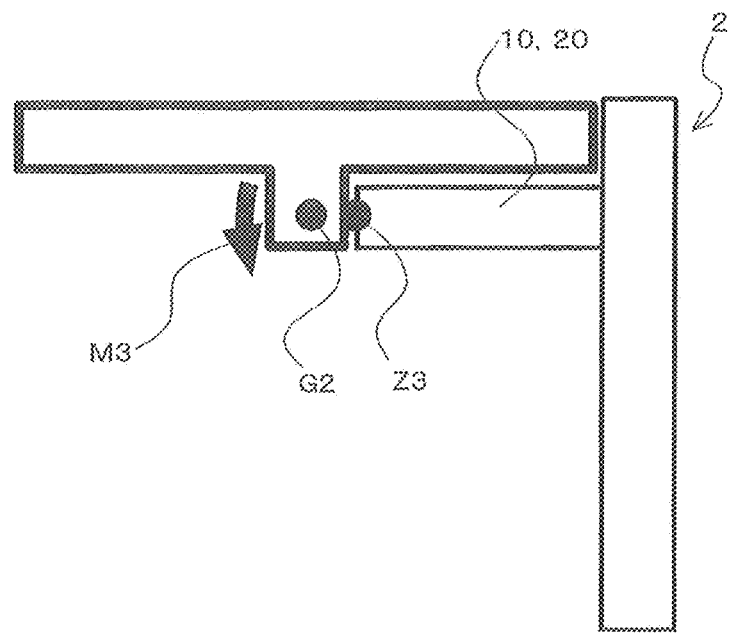
FIG. 27 is an explanatory diagram for explaining the moment acted on a screw hole of the mounting part of the fan unit in the indoor unit of the air-conditioning apparatus according to the embodiment of the present invention.
Figure 28:
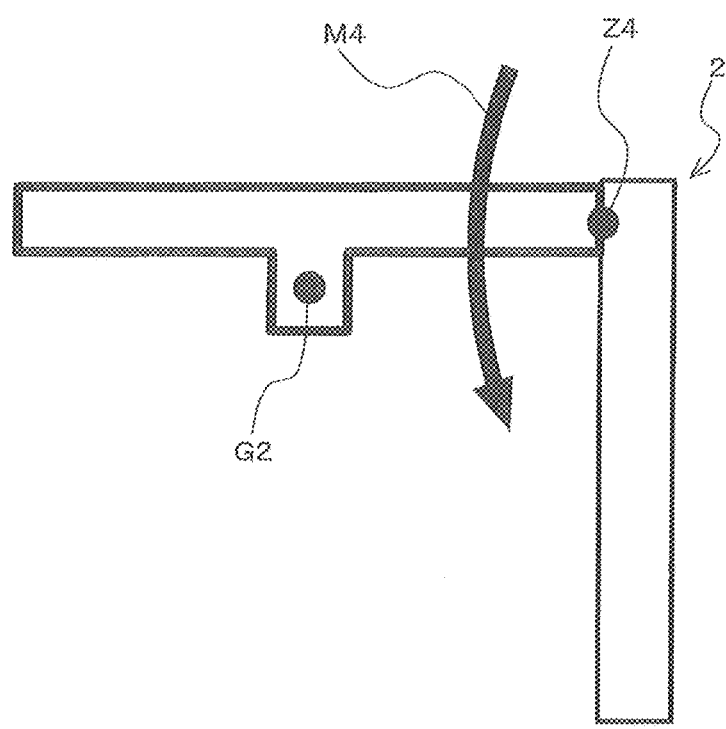
FIG. 28 is an explanatory diagram for explaining the moment acted on the screw hole of the mounting part of the fan unit, when a conventional mounting structure is adopted as a mounting structure of the fan unit, in the indoor unit of the air-conditioning apparatus according to the embodiment of the present invention.

FIG. 27 is an explanatory diagram for explaining the moment acted on the screw hole of the mounting part of the fan unit in the indoor unit of the air-conditioning apparatus according to the embodiment of the present invention. Further, FIG. 28 is an explanatory diagram for explaining the moment acted on the screw hole of the mounting part of the fan unit, when a conventional mounting structure is adopted as a mounting structure of the fan unit, in the indoor unit of the air-conditioning apparatus according to the embodiment of the present invention. It should be noted that a reference character G2 shown in FIG. 27 and FIG. 28 denotes the center of gravity of the fan unit 30.

In a conventional indoor unit, the support arms 10 and 20 as described in the present embodiment are not provided to the back plate. As such, when the fan unit 30 is mounted on the back plate 2 in the conventional mounting structure, the fan unit 30 is mounted at a position Z4 shown in FIG. 28. As such, the mounting position Z4 and the center of gravity G2 of the fan unit 30 are distant from each other, whereby the moment M4 acted on the screw hole (screw hole for fixing the fan unit 30) formed at the mounting position Z4 on the back plate 2 is large. As such, breakage of the screw hole is concerned.

On the other hand, the indoor unit 100 of the present embodiment is structured such that a partial load of the fan unit 30 is supported by the support arms 10 and 20. As such, as the moment acted on the screw hole for fixing the fan unit 30 can be reduced, it is possible to prevent breakage of the screw hole. Further, in the indoor unit 100 of the present embodiment, the fan unit 30 is mounted on the first tip portions 12 and 22 of the support arms 10 and 20. As such, the fan unit 30 is mounted at a position Z3 shown in FIG. 27. Accordingly, as the distance between the mounting position Z3 and the center of gravity G2 of the fan unit 30 can be shortened, the moment M3 acted on the screw holes 14a and 24a (screw holes for fixing the fan unit 30) formed at the mounting position Z3 on the back plate 2 can be reduced. Thereby, it is possible to further prevent breakage of the screw holes 14a and 24a.

In this case, it is preferable to have a structure in which the first tip portions 12 and 22 of the support arms 10 and 20 extend forward beyond the center of gravity G2 of the fan unit 30. With this structure, the entire load of the fan unit 30 can be supported by the support arms 10 and 20. As such, no moment is acted on the screw holes for fixing the fan unit 30, whereby it is possible to securely prevent breakage of the screw holes. It should be noted that this effect can also be achieved in the case other than the case where the screw holes 14a and 24a for fixing the fan unit 30 are formed in the first tip portions 12 and 22 of the support arms 10 and 20, that is, the case where the screw holes for fixing the fan unit 30 are formed at positions other than the screw holes 14a and 24a.

The invention claimed is:

1. An indoor unit of an air-conditioning apparatus, comprising:
    a casing having an air inlet formed in an upper surface, an air outlet formed below the air inlet, and a back plate constituting a back surface;
    a fan unit including a fan outer frame having a bell mouth, an axial fan provided in the bell mouth, and a motor that drives the axial fan, the fan unit being provided downstream of the air inlet in the casing; and
    a heat exchanger provided downstream of the axial fan in the casing, the heat exchanger being configured to exchange heat between air, taken into the casing by the axial fan, and refrigerant, wherein
    the back plate includes a pair of support arms protruding forward from the back plate, the pair of support arms being connected to the back plate only at end portions in a width direction of the back plate, and
    the fan unit is supported in the casing by the pair of support arms from below.

2. The indoor unit of the air-conditioning apparatus of claim 1, wherein
    the fan outer frame includes mounting plates each having a first through hole, the mounting plates each being provided in front of each of the support arms,
    each of the support arms has a first screw hole formed at a position facing the first through hole of the mounting plate, and
    the fan unit is fixed to the support arms by screwing and fixing screws, inserted in the first through holes of the mounting plates, to the first screw holes of the support arms.

3. The indoor unit of the air-conditioning apparatus of claim 2, wherein
    each of the mounting plates has a first recess, and
    a tip portion of each of the support arms has a positioning pin protruding therefrom, the positioning pin being to be inserted in the first recess of the mounting plate.

4. The indoor unit of the air-conditioning apparatus of claim 1, wherein
    the fan outer frame has a guide groove formed along a front and back direction at a position facing an upper part of at least one of the support arms, and
    the at least one of the support arms is inserted in the guide groove slidably in the front and back direction.

5. The indoor unit of the air-conditioning apparatus of claim 1, wherein
    front end portions of the pair of support arms extend forward beyond a center of gravity of the fan unit.

6. The indoor unit of the air-conditioning apparatus of claim 1, wherein
    the heat exchanger includes a pair of side plates provided to right and left ends,
    each of the side plates includes mounting parts each having a second through hole, the mounting parts each being provided in front of each of the support arms,
    each of the support arms has a second screw hole formed at a position facing the second through hole of the mounting part, and
    the heat exchanger is fixed to the support arms by screwing and fixing screws, inserted in the second through holes of the mounting parts, to the second screw holes of the support arms.

7. The indoor unit of the air-conditioning apparatus of claim 6, wherein
    each of the mounting parts has a second recess, and
    a tip portion of each of the support arms has a positioning pin protruding therefrom, the positioning pin being to be inserted in the second recess of the mounting part.

8. The indoor unit of the air-conditioning apparatus of claim 6, wherein
    the heat exchanger includes a first heat exchange element, a second heat exchange element, a third heat exchange element, and a fourth heat exchange element, and the first heat exchange element, the second heat exchange element, the third heat exchange element, and the fourth heat exchange element are arranged from a front face side to a back face side of the casing,
    the first heat exchange element, the second heat exchange element, the third heat exchange element, and the fourth heat exchange element are arranged in a W shape in a side view, and
    tip portions of the support arms extend to a position facing an upper end portion of the second heat exchange element or an upper end portion of the third heat exchange element.

9. The indoor unit of the air-conditioning apparatus of claim 8, wherein
    the first heat exchange element, the second heat exchange element, the third heat exchange element, and the fourth heat exchange element are uniform in size.

10. The indoor unit of the air-conditioning apparatus of claim 1, further comprising
    a cleaning unit including a filter for removing dust from air taken into the casing, and a cleaning mechanism for removing the dust adhering to the filter and storing the dust, wherein
    the cleaning unit is disposed above the fan unit and is supported by the fan unit from below.

11. The indoor unit of the air-conditioning apparatus of claim 1, wherein
    one the pair of the support arms is connected to the back plate at a far right end in the width direction of the back plate, and
    a second, other of the pair of the support arms is connected to the back plate at a far left end in the width direction of the back plate.

12. The indoor unit of the air-conditioning apparatus of claim 1, wherein
    each of the pair of support arms extends forward from the back plate of the casing to a distance that is less than half of the length of the casing in a back-front direction.

13. The indoor unit of the air-conditioning apparatus of claim 12, wherein
    each of the pair of support arms does not contact a front end or a front plate of the casing.

14. The indoor unit of the air-conditioning apparatus of claim 11, wherein
  each of the pair of support arms extends forward from the back plate of the casing to a distance that is less than half of the length of the casing in a back-front direction.

15. The indoor unit of the air-conditioning apparatus of claim 14, wherein
  each of the pair of support arms does not contact a front end or a front plate of the casing.

\* \* \* \* \*